US012795746B2

(12) United States Patent
Xing et al.

(10) Patent No.: US 12,795,746 B2

(45) Date of Patent: Nov. 10, 2026

(54) RANDOM ACCESS METHOD, TERMINAL DEVICE, AND NETWORK DEVICE

(71) Applicant: Huawei Technologies Co., Ltd., Shenzhen (CN)

(72) Inventors: Shuangshuang Xing, Shenzhen (CN); Yiqun Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 870 days.

(21) Appl. No.: 17/673,561

(22) Filed: Feb. 16, 2022

(65) Prior Publication Data

US 2022/0174752 A1 Jun. 2, 2022

Related U.S. Application Data

(63) Continuation of application No. PCT/CN2019/101223, filed on Aug. 16, 2019.

(51) Int. Cl.

*H04W 74/0833* (2024.01)
*H04L 5/00* (2006.01)

(Continued)

(52) U.S. Cl.

CPC ....... *H04W 74/0841* (2013.01); *H04L 5/0051* (2013.01); *H04W 24/10* (2013.01); *H04W 74/0833* (2013.01); *H04W 74/0836* (2024.01)

(58) Field of Classification Search

CPC ............. H04W 74/0841; H04W 24/10; H04W 74/0833; H04W 74/006; H04L 5/0051; H04L 5/0053

See application file for complete search history.

(56) References Cited

U.S. PATENT DOCUMENTS

2018/0110074 A1* 4/2018 Akkarakaran .... H04W 74/0833
2018/0110075 A1* 4/2018 Ly ..................... H04W 74/0833

(Continued)

FOREIGN PATENT DOCUMENTS

CN 108282895 A 7/2018
CN 109863814 A 6/2019

OTHER PUBLICATIONS

"2 step RA: Selection between 2 step RACH and 4 step RACH," 3GPP TSG-RAN2 107, Prague, Czech Republic, R2-1908812_2 , Total 3 pages, 3rd Generation Partnership Project, Valbonne, France (Aug. 26-30, 2019).

(Continued)

*Primary Examiner* — Charles N Appiah
*Assistant Examiner* — Frank E Donado
(74) *Attorney, Agent, or Firm* — Leydig, Voit & Mayer, Ltd.

(57) ABSTRACT

This application discloses a random access method. The method includes: The terminal device receives configuration information sent by the network device, where the configuration information includes at least one threshold, the at least one threshold includes a first threshold and a second threshold, the first threshold is used by the terminal device to select a random access type, the second threshold is used by the terminal device to select one downlink reference signal from a plurality of downlink reference signals, and the second threshold is a reference signal received power RSRP threshold. The terminal device determines the random access type and the downlink reference signal based on the at least one threshold. The terminal device determines one random access transmission occasion based on the determined downlink reference signal. The terminal device sends a message of the random access type on the random access transmission occasion.

18 Claims, 15 Drawing Sheets

(51) Int. Cl.
*H04W 24/10* (2009.01)
*H04W 74/0836* (2024.01)

(56) References Cited

U.S. PATENT DOCUMENTS

| | | | | |
|---|---|---|---|---|
| 2020/0100297 | A1* | 3/2020 | Agiwal | H04W 52/365 |
| 2020/0260498 | A1* | 8/2020 | Xu | H04W 74/006 |
| 2020/0314913 | A1* | 10/2020 | Rastegardoost | H04W 56/0045 |
| 2021/0352713 | A1* | 11/2021 | Wu | H04L 5/0044 |
| 2022/0053575 | A1* | 2/2022 | He | H04W 56/004 |
| 2022/0210838 | A1* | 6/2022 | Lei | H04L 5/0048 |
| 2022/0264659 | A1* | 8/2022 | Enbuske | H04W 74/0866 |
| 2024/0334499 | A1* | 10/2024 | Lin | H04W 74/0836 |

OTHER PUBLICATIONS

"Considerations for simultaneous RACH operation," 3GPP TSG RAN WG1 Meeting #97, Reno, USA, R1-1907540, Total 3 pages, 3rd Generation Partnership Project, Valbonne, France (May 13-17, 2019).

"Discussion on the MsgA resource selection," 3GPP TSG-RAN WG2 Meeting #106, R2-1905655, Reno, USA, Total 7 pages, 3rd Generation Partnership Project, Valbonne, France (May 13-17, 2019).

"NR two-step random access procedure," 3GPP TSG-RAN WG1 NR adhoc, R1-1700300, Spokane, USA, pp. 1-4, 3rd Generation Partnership Project, Valbonne, France (Jan. 16-20, 2017).

"Feature lead summary#3 on 2 step RACH procedures," 3GPP TSG RAN WG1 #97, R1-1907900, Reno, USA, pp. 1-59, 3rd Generation Partnership Project, Valbonne, France (May 13-17, 2019).

"3rd Generation Partnership Project; Technical Specification Group Radio Access Network; NR; Medium Access Control (MAC) protocol specification (Release 15)," 3GPP TS 38.321 V15.6.0, pp. 1-78 pages, 3rd Generation Partnership Project, Valbonne, France (Jun. 2019).

"3rd Generation Partnership Project; Technical Specification Group Radio Access Network; NR; Physical layer procedures for control (Release 15)," 3GPP TS 38.213 V15.6.0, pp. 1-107, 3rd Generation Partnership Project, Valbonne, France (Jun. 2019).

"New work item: 2-step RACH for NR," 3GPP TSG RAN Meeting #82, RP-182894, Sorrento, Italy, Total 5 pages, 3rd Generation Partnership Project, Valbonne, France (Dec. 10-13, 2018).

* cited by examiner

RANDOM ACCESS METHOD, TERMINAL DEVICE, AND NETWORK DEVICE

CROSS-REFERENCE TO RELATED APPLICATIONS

This application is a International Application No. PCT/CN2019/101223, filed on Aug. 16, 2019, the disclosure of which is hereby incorporated by reference in its entirety.

TECHNICAL FIELD

This application relates to the field of communications technologies, and in particular, to a random access method, a terminal device, and a network device.

BACKGROUND

With rapid development of ultra-reliable low-latency (URLLC) communication, machine type communication (MTC), and the internet of things (IOT) in the future, data transmission that is used for sparse packets and that requires a low latency also has an increasing quantity of application scenarios. Due to a latency caused by multi-step interaction between a terminal device and a network device, a conventional 4-step random access channel (4-Step RACH) procedure becomes a technical bottleneck of transmission of this type of data service. A 2-step RACH procedure is then proposed as a mainstream solution for reducing the latency, and a main idea of the solution is to reduce four steps in the conventional 4-step RACH procedure to two steps, to accelerate the random access procedure.

In the current Rel-15 NR standard protocol, when a terminal device initiates a 4-step RACH procedure, the terminal device may select a carrier type based on a reference signal received power (RSRP) during random access procedure initialization; and the terminal device may select, during random access resource selection, a synchronization signal block SSB based on a measurement value RSRP carried in the synchronization signal block (SSB).

With development of communications technologies, an increasing quantity of terminal devices support both the two random access manners: 2-step RACH and 4-step RACH. However, the current standard protocol does not specify random access type selection. When the terminal device initiates random access, the terminal device needs to consider how to select one random access manner from the 2-step RACH and the 4-step RACH to perform the random access.

SUMMARY

Embodiments of this application provide a random access method and a terminal device, to enable the terminal device to select one random access type from 2-step RACH and 4-step RACH to perform random access.

According to a first aspect, a random access method is provided. The method includes: A terminal device receives configuration information sent by a network device, where the configuration information includes at least one threshold, the at least one threshold includes a first threshold and a second threshold, the first threshold is used by the terminal device to select a random access type, the second threshold is used by the terminal device to select one downlink reference signal from a plurality of downlink reference signals, each of the plurality of downlink reference signals is associated with one or more random access transmission occasions, and the second threshold is a reference signal received power RSRP threshold; the terminal device determines the random access type and the downlink reference signal based on the at least one threshold; the terminal device determines one random access transmission occasion based on the determined downlink reference signal; and the terminal device sends a message of the random access type on the random access transmission occasion. The downlink reference signal may be any downlink reference signal, for example, an SSB, or a channel state information-reference signal (CSI-RS).

The random access type may include 4-step random access and 2-step random access. The 4-step random access is compared with the 2-step random access below. In a wireless transmission service, during the 4-step random access, when a preamble is successfully transmitted, the terminal device sends a msg3 to the network device. When uplink data transmission is performed by using the msg3, transmission of a relatively large data packet can be supported. A transmission latency of the 4-step random access completed by the terminal device is relatively high. During the 2-step random access, after transmitting a preamble sequence, the terminal device can directly perform uplink data transmission without waiting for a response message that is for the preamble sequence sent by the terminal device and that is sent by the network device. A msgA carries a relatively small service data packet to ensure data transmission reliability. A transmission latency of the 2-step random access completed by the terminal device is relatively low. Therefore, the random access type to be selected may be determined based on a current network status, and the network status may be determined through comparison with the threshold. Therefore, in this application, the threshold is configured, so that the terminal device can switch the random access type based on the network status. In this way, a random access manner is more flexible, and a success rate and efficiency of random access are improved.

In an embodiment, the first threshold is at least one of the following thresholds: an RSRP threshold, a threshold of a size of to-be-transmitted uplink data, and a threshold of a time difference between a first random access transmission occasion and a second random access transmission occasion associated with a same downlink reference signal. The first random access transmission occasion and the second random access transmission occasion correspond to different random access types. For example, the random access type may be determined by comparing a channel measurement value with the RSRP threshold. Alternatively, the random access type may be determined by comparing a data packet size of a PUSCH with the threshold of the size of the to-be-transmitted uplink data. Alternatively, the random access type may be determined by comparing the threshold of the time difference with a time difference between a reference time point corresponding to a transmission occasion that is for the 2-step random access and that is associated with an SSB selected by the terminal device and a reference time point corresponding to a transmission occasion that is for the 4-step random access and that is associated with the SSB. The first threshold may alternatively be a network status indication value, and the network status indication value may be an indication value used to indicate a configuration such as a quantity of active users, a resource, or a capacity of a network. For example, when the indication value of the quantity of active users indicates that the quantity of active users is relatively large, the terminal device may select the 2-step random access; otherwise, the terminal device may select the 4-step random access. In some embodiments, the network status indication value may alternatively be an indication value that directly indicates the random access type to be selected by the terminal device. For example, when determining that the 2-step random access can be selected, the network device sets the network status indication value to 1, and when determining that the 4-step random access can be selected, sets the network status indication value to 0.

In an embodiment, that the terminal device determines the random access type based on the at least one threshold includes: The terminal device determines the random access type based on a channel measurement value and the first threshold, where the channel measurement value is a measurement value obtained based on RSRPs of the plurality of downlink reference signals. The channel measurement value may be an RSRP value for measuring cell quality, and may reflect current cell channel quality, so that the terminal device selects the random access type based on the channel measurement value.

In an embodiment, that the terminal device determines the random access type and the downlink reference signal based on the at least one threshold includes: When determining that the channel measurement value is greater than or equal to the first threshold (rsrp-threshold-ratype), the terminal device determines that the random access manner is 2-step random access; and when determining that a measurement value of at least one received downlink reference signal is greater than or equal to the second threshold (2step-rsrp-threshold-SSB), the terminal device determines one downlink reference signal from the at least one downlink reference signal; or when determining that measurement values of the plurality of received downlink reference signals are less than the second threshold (2step-rsrp-threshold-SSB), the terminal device selects any one of the plurality of received downlink reference signals. That is, when the channel quality is good, the 2-step random access with a higher transmission reliability requirement may be selected, so that a transmission latency of the random access completed by the terminal device is low.

In an embodiment, that the terminal device determines the random access type and the downlink reference signal based on the at least one threshold includes: When determining that the channel measurement value is less than the first threshold (rsrp-threshold-ratype), the terminal device determines that the random access manner is 4-step random access; and when determining that a measurement value of at least one received downlink reference signal is greater than or equal to the second threshold (4step-rsrp-threshold-SSB), the terminal device determines one downlink reference signal from the at least one downlink reference signal; or when determining that measurement values of the plurality of received downlink reference signals are less than the second threshold (4step-rsrp-threshold-SSB), the terminal device selects any one of the plurality of received downlink reference signals. That is, when the channel quality is average, the 4-step random access with a relatively high transmission latency may be selected to ensure transmission reliability. A value of the second threshold 4step-rsrp-threshold-SSB and a value of the second threshold 2step-rsrp-threshold-SSB that are used for SSB selection may be the same or different.

In an embodiment, that the terminal device determines the random access type and the downlink reference signal based on the at least one threshold includes: When determining that an RSRP of at least one downlink reference signal in the plurality of received downlink reference signals is greater than or equal to the second threshold (rsrp-threshold-SSB), the terminal device determines one downlink reference signal from the at least one downlink reference signal; and when a measurement value of the determined downlink reference signal is greater than or equal to the first threshold (threshold-ratype), the terminal device determines that the random access type is 2-step random access; or when a measurement value of the determined downlink reference signal is less than the first threshold (threshold-ratype), the terminal device determines that the random access type is 4-step random access. A type of the measurement value of the determined downlink reference signal is the same as a type of the first threshold. In this design, the terminal device first performs SSB selection, and then performs random access type selection, and the terminal device also can select, through comparison with the threshold, a random access type and a downlink reference signal that are more suitable for a current network status.

In an embodiment, that the terminal device determines the random access type and the downlink reference signal based on the at least one threshold includes: When determining that RSRPs of the plurality of received downlink reference signals are less than the second threshold (rsrp-threshold-SSB), the terminal device determines one downlink reference signal from the plurality of received downlink reference signals, and determines that the random access type is the 4-step random access.

In an embodiment, the first threshold (rsrp-threshold-2step) is greater than or equal to the second threshold (rsrp-thresholdSSB). That the terminal device determines the random access type and the downlink reference signal based on the at least one threshold includes: When a channel measurement value of the terminal device is greater than or equal to the first threshold (rsrp-threshold-2step) and an RSRP of at least one downlink reference signal is greater than or equal to the first threshold (rsrp-threshold-2step), the terminal device determines one downlink reference signal from the at least one downlink reference signal; and when a measurement value of the determined downlink reference signal is greater than or equal to a third threshold (threshold-ratype), the terminal device determines that the random access type is 2-step random access; or when a measurement value of the determined downlink reference signal is less than a third threshold (threshold-ratype), the terminal device determines that the random access type is 4-step random access. A type of the measurement value of the determined downlink reference signal is the same as a type of the first threshold. In this design, the terminal device also can first perform random access type selection, and then perform SSB selection. This makes a relatively small modification to a current protocol. Similarly, the terminal device can select, through comparison with the threshold, a random access type and a downlink reference signal that are more suitable for a current network status, and the random access type selection is more flexible.

In an embodiment, the first threshold (rsrp-threshold-2step) is less than the second threshold (rsrp-thresholdSSB). That the terminal device determines the random access type and the downlink reference signal based on the at least one threshold includes: When determining that a channel measurement value is greater than or equal to the first threshold (rsrp-threshold-2step) and an RSRP of the at least one downlink reference signal is greater than or equal to the second threshold (rsrp-thresholdSSB), the terminal device selects one downlink reference signal from the at least one downlink reference signal, and determines that the random access manner is 2-step random access; or when determining that a channel quality measurement value is greater than or equal to the first threshold (rsrp-threshold-2step) and RSRPs of the plurality of received downlink reference signals are less than the second threshold (rsrp-thresholdSSB), the terminal device selects any downlink reference signal from all downlink reference signals whose RSRPs are greater than or equal to the first threshold (rsrp-threshold-2step); and when a measurement value of the selected downlink reference signal is greater than or equal to a third threshold (threshold-ratype), the terminal device determines that the random access type is 2-step random access. A type of the measurement value of the selected downlink reference signal is the same as a type of the first threshold. The third threshold may also be the threshold of the size of the to-be-transmitted uplink data, the network status indication value, the threshold of the time difference, or the like. This is not limited in this application.

In an embodiment, that the terminal device determines the random access type and the downlink reference signal based on the at least one threshold includes: When determining that the channel quality measurement value is greater than or equal to the first threshold (rsrp-threshold-2step) and the RSRPs of the plurality of received downlink reference signals are less than the first threshold (rsrp-threshold-2step), the terminal device selects any downlink reference signal from the plurality of downlink reference signals, and determines that the random access type is 4-step random access.

In an embodiment, that the terminal device determines the random access type and the downlink reference signal based on the at least one threshold includes: When determining that a channel measurement value is less than the first threshold, the terminal device determines that the random access manner is 4-step random access; and when determining that an RSRP of at least one downlink reference signal is greater than or equal to the second threshold, the terminal device determines one downlink reference signal from the at least one downlink reference signal; or when determining that RSRPs of the plurality of received downlink reference signals are less than the second threshold, the terminal device selects any downlink reference signal from the plurality of downlink reference signals.

In an embodiment, that the terminal device determines the random access type and the downlink reference signal based on the at least one threshold includes: When determining that an RSRP of at least one downlink reference signal is greater than or equal to the first threshold (rsrp-threshold-SSB-2step), the terminal device determines that the random access type is 2-step random access, and selects any downlink reference signal from the at least one downlink reference signal; or when determining that RSRPs of the plurality of received downlink reference signals are less than the first threshold (rsrp-thresholdSSB-2step), the terminal device determines that the random access type is 4-step random access; and when determining that a measurement value of at least one downlink reference signal is greater than or equal to the second threshold (rsrp-thresholdSSB), the terminal device selects any downlink reference signal from the at least one downlink reference signal; or when determining that measurement values of all the downlink reference signals are less than the second threshold (rsrp-threshold-SSB), the terminal device selects any downlink reference signal from all the downlink reference signals. It can be learned that, in this design, the terminal device implements random access type selection and downlink reference signal selection together, and determines a random access type and a downlink reference signal in a current network status through comparison with the threshold. This improves a success rate of random access and avoids a waste of system resources.

According to a second aspect, a random access method is provided. The method includes: A terminal device receives configuration information sent by a network device, where the configuration information includes a first threshold, the first threshold is used by the terminal device to select a random access type and to select one downlink reference signal from a plurality of downlink reference signals, and each of the plurality of downlink reference signals is associated with one or more random access transmission occasions; the terminal device determines the random access type and the downlink reference signal based on the first threshold; the terminal device determines one random access transmission occasion based on the determined downlink reference signal; and the terminal device sends a message of the random access type on the random access transmission occasion.

In an embodiment, that the terminal device determines the random access type and the downlink reference signal based on the first threshold includes: When determining that a measurement value of at least one downlink reference signal is greater than or equal to the first threshold (rsrp-thresholdSSB-2step), the terminal device determines that the random access type is 2-step random access, and selects any downlink reference signal from the at least one downlink reference signal; or when determining that measurement values of all the downlink reference signals are less than the first threshold (rsrp-thresholdSSB-2step), the terminal device determines that the random access type is 4-step random access, and selects any downlink reference signal from all the downlink reference signals. In this design, the random access type and the downlink reference signal are selected through comparison with one threshold, so that the process is simpler.

According to a third aspect, a random access method is provided. The method includes: A network device sends configuration information to a terminal device, where the configuration information includes at least one threshold, the at least one threshold includes a first threshold and a second threshold, the first threshold is used by the terminal device to select a random access type, the second threshold is used by the terminal device to select one reference signal from a plurality of reference signals, each of the plurality of reference signals is associated with one or more random access transmission occasions, and the second threshold is a reference signal received power RSRP threshold; and the network device receives a message that is of the random access type and that is sent by the terminal based on the configuration information. For beneficial effects of the second aspect, refer to the first aspect. Details are not described herein again.

In an embodiment, the first threshold is at least one of the following thresholds: an RSRP threshold, a threshold of a size of to-be-transmitted uplink data, and a threshold of a time difference between a first random access transmission occasion and a second random access transmission occasion associated with a same reference signal. The first random access transmission occasion and the second random access transmission occasion correspond to different random access types.

According to a fourth aspect, a terminal device is provided. The terminal device includes: a transceiver, configured to receive configuration information sent by a network device, where the configuration information includes at least one threshold, the at least one threshold includes a first threshold and a second threshold, the first threshold is used by the terminal device to select a random access type, the second threshold is used by the terminal device to select one downlink reference signal from a plurality of downlink reference signals, each of the plurality of downlink reference signals is associated with one or more random access transmission occasions, and the second threshold is a reference signal received power RSRP threshold; and a processor, configured to determine the random access type and the downlink reference signal based on the at least one threshold. The processor is further configured to determine one random access transmission occasion based on the determined downlink reference signal. The transceiver is further configured to send a message of the random access type on the random access transmission occasion.

In an embodiment, the first threshold is at least one of the following thresholds: an RSRP threshold, a threshold of a size of to-be-transmitted uplink data, and a threshold of a time difference between a first random access transmission occasion and a second random access transmission occasion associated with a same downlink reference signal. The first random access transmission occasion and the second random access transmission occasion correspond to different random access types.

In an embodiment, the processor is configured to determine the random access type based on a channel measurement value and the first threshold, where the channel measurement value is a measurement value obtained based on RSRPs of the plurality of reference signals.

In an embodiment, the processor is configured to: when determining that the channel measurement value is greater than or equal to the first threshold, determine that the random access manner is 2-step random access; and when determining that a measurement value of at least one received downlink reference signal is greater than or equal to the second threshold, determine one downlink reference signal from the at least one downlink reference signal; or when determining that measurement values of the plurality of received downlink reference signals are less than the second threshold, select any one of the plurality of received downlink reference signals.

In an embodiment, the processor is configured to: when determining that the channel measurement value is less than the first threshold, determine that the random access manner is 4-step random access; and when determining that a measurement value of at least one received downlink reference signal is greater than or equal to the second threshold, determine one downlink reference signal from the at least one downlink reference signal; or when determining that measurement values of the plurality of received downlink reference signals are less than the second threshold, select, by the terminal device, any one of the plurality of received downlink reference signals.

In an embodiment, the processor is configured to: when determining that an RSRP of at least one downlink reference signal in the plurality of received downlink reference signals is greater than or equal to the second threshold, determine one downlink reference signal from the at least one downlink reference signal; and when a measurement value of the determined downlink reference signal is greater than or equal to the first threshold, determine that the random access type is 2-step random access; or when a measurement value of the determined downlink reference signal is less than the first threshold, determine that the random access type is 4-step random access. A type of the measurement value of the determined downlink reference signal is the same as a type of the first threshold.

In an embodiment, the processor is configured to: when determining that RSRPs of the plurality of received downlink reference signals are less than the second threshold, determine one downlink reference signal from the plurality of received downlink reference signals, and determine that the random access type is the 4-step random access.

In an embodiment, the first threshold is greater than or equal to the second threshold. The processor is configured to: when a channel measurement value of the terminal device is greater than or equal to the first threshold and an RSRP of at least one downlink reference signal is greater than or equal to the first threshold, determine one downlink reference signal from the at least one downlink reference signal; and when a measurement value of the determined downlink reference signal is greater than or equal to a third threshold, determine that the random access type is 2-step random access; or when a measurement value of the determined downlink reference signal is less than a third threshold, determine that the random access type is 4-step random access. A type of the measurement value of the determined downlink reference signal is the same as a type of the first threshold.

In an embodiment, the first threshold is less than the second threshold. The processor is configured to: when determining that a channel measurement value is greater than or equal to the first threshold and an RSRP of at least one downlink reference signal is greater than or equal to the second threshold, select one downlink reference signal from the at least one downlink reference signal, and determine that the random access manner is 2-step random access; or when determining that a channel quality measurement value is greater than or equal to the first threshold and RSRPs of the plurality of received downlink reference signals are less than the second threshold, select any downlink reference signal from all downlink reference signals whose RSRPs are greater than or equal to the first threshold; and when a measurement value of the selected downlink reference signal is greater than or equal to a third threshold, determine that the random access type is 2-step random access. The third threshold may also be the threshold of the size of the to-be-transmitted uplink data, a network status indication value, the threshold of the time difference, or the like. This is not limited in this application. A type of the measurement value of the selected downlink reference signal is the same as a type of the first threshold.

In an embodiment, the processor is configured to: when determining that a channel quality measurement value is greater than or equal to the first threshold and RSRPs of the plurality of received downlink reference signals are less than the first threshold, select any downlink reference signal from the plurality of downlink reference signals, and determine that the random access type is 4-step random access.

In an embodiment, the processor is configured to: when determining that a channel measurement value is less than the first threshold, determine that the random access type is 4-step random access; and when determining that an RSRP of at least one downlink reference signal is greater than or equal to the second threshold, determine one downlink reference signal from the at least one downlink reference signal; or when determining that RSRPs of the plurality of received downlink reference signals are less than the second threshold, select any downlink reference signal from the plurality of downlink reference signals. In an embodiment, the processor is configured to: when determining that an RSRP of at least one downlink reference signal is greater than or equal to the first threshold, determine that the random access type is 2-step random access, and select any downlink reference signal from the at least one downlink reference signal; or when determining that RSRPs of the plurality of received downlink reference signals are less than the first threshold, determine that the random access type is 4-step random access; and when determining that a measurement value of at least one downlink reference signal is greater than or equal to the second threshold, select any downlink reference signal from the at least one downlink reference signal; or when determining that measurement values of all the downlink reference signals are less than the second threshold, select any downlink reference signal from all the downlink reference signals.

In an embodiment, the processor is configured to: when determining that a measurement value of at least one downlink reference signal is greater than or equal to the first threshold, determine that the random access type is 2-step random access, and select any downlink reference signal from the at least one downlink reference signal; or when determining that measurement values of all the downlink reference signals are less than the first threshold, determine that the random access type is 4-step random access, and select any downlink reference signal from all the downlink reference signals.

According to a fifth aspect, a network device is provided. The network device includes a transceiver and a memory. The memory is configured to store a program and/or data. The transceiver is configured to send configuration information to a terminal device, where the configuration information includes at least one threshold, the at least one threshold includes a first threshold and a second threshold, the first threshold is used by the terminal device to select a random access type, the second threshold is used by the terminal device to select one reference signal from a plurality of reference signals, each of the plurality of reference signals is associated with one or more random access transmission occasions, and the second threshold is a reference signal received power RSRP threshold. The transceiver is further configured to receive a message that is of the random access type and that is sent by the terminal based on the configuration information.

In an embodiment, the first threshold is at least one of the following thresholds: an RSRP threshold, a threshold of a size of to-be-transmitted uplink data, and a threshold of a time difference between a first random access transmission occasion and a second random access transmission occasion associated with a same reference signal. The first random access transmission occasion and the second random access transmission occasion correspond to different random access types.

According to a fifth aspect, an embodiment of this application provides a computer-readable storage medium, configured to store a computer software instruction, and the computer software instruction includes a program designed to perform any one of the first aspect, the second aspect, and the third aspect.

According to a sixth aspect, an embodiment of this application provides a computer program product including an instruction. When the computer program product runs on an electronic device, the computer electronic device is enabled to perform the method according to any one of the first aspect, the second aspect, and the third aspect.

DESCRIPTION OF EMBODIMENTS

Figure 1:
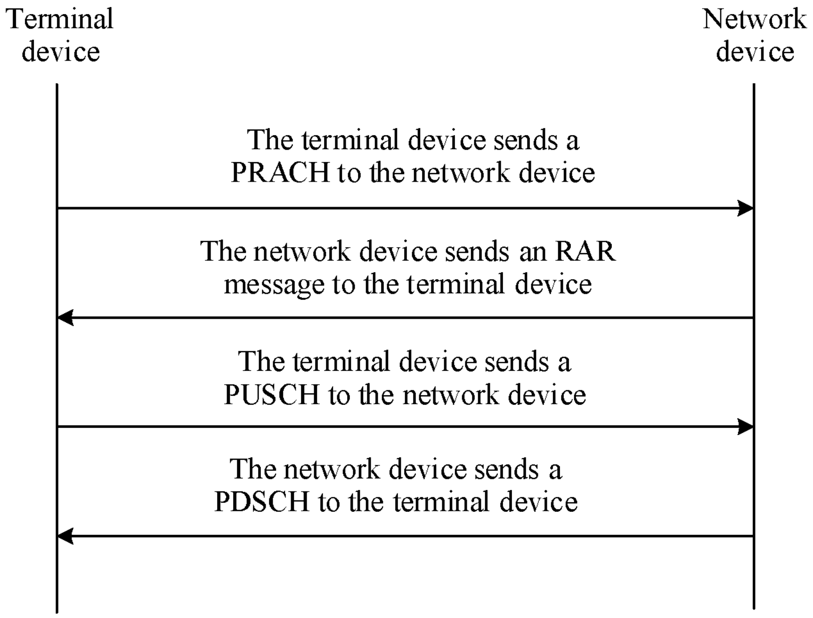
FIG. 1 is a schematic flowchart of 4-step random access.

For ease of understanding, example descriptions of some concepts related to this application are provided for reference, as shown below:

4-step random access procedure: As shown in FIG. 1, the 4-step random access procedure includes four steps: (1) A terminal device sends a message 1 (msg1) to a network device, where the message 1 carries a random access preamble sequence. Specifically, the terminal device may select any preamble, which may also be referred to as a random access preamble sequence (random access preamble), and send the preamble sequence on a physical random access channel (PRACH). (2) The network device sends a random access response (RAR) message, which may also be referred to as a message 2 (msg2), to the terminal device. To be specific, after detecting that the preamble is sent, the network device sends the RAR message in downlink, where the RAR message includes at least the following information: a number of the preamble received by the network device, timing adjustment information, location indication information of an uplink resource allocated to the terminal device, a temporary cell radio network temporary identifier (TC-RNTI), and the like. (3) The terminal device sends, to the network device, uplink data, which may also be referred to as a message 3 (msg3), carried on a physical uplink shared channel ( ) To be specific, after receiving the RAR message, the terminal device sends, based on an indication in the RAR message, an uplink message on the allocated uplink resource. (4) The network device sends a contention resolution message (CRM), which may also be referred to as a message 4 (msg4), to the terminal device through a physical downlink shared channel (PDSCH). When the terminal device receives the message 4, and a contention resolution identity (CRID) of the received CRM matches identification information transmitted by the terminal, the terminal device may consider that the random access succeeds.

Figure 2:
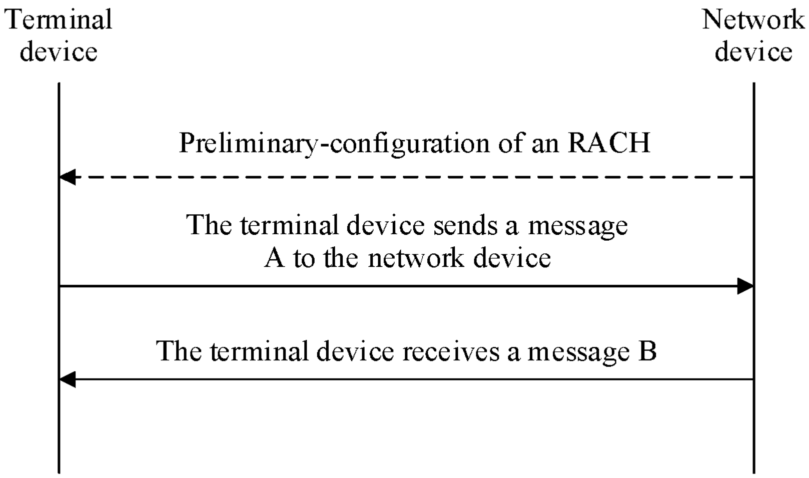
FIG. 2 is a schematic flowchart of 2-step random access.

2-step random access procedure: As shown in FIG. 2, the 2-step random access procedure includes two steps: Step 1: A terminal device sends a message A (msgA) to a network device, where the message A includes a PRACH and a PUSCH, and the PRACH carries a preamble. Step 2: The terminal device receives a response, namely, a message B (msgB), that is sent by the network device and that is for the message A, where response content of the message B includes at least one of a response for the preamble and a response for the PUSCH. For example, in an embodiment, the message A sent by the terminal device includes content of the message 1 and the message 3 in the 4-step RACH. The message B sent by the network device to the terminal device includes content of the message 2 and the message 4 in the 4-step RACH.

The 4-step random access is compared with the 2-step random access below. In a wireless transmission service, during the 4-step random access, when the preamble is successfully transmitted, the terminal device sends the msg3 to the network device. When uplink data transmission is performed by using the msg3, transmission of a relatively large data packet can be supported. A transmission latency of the 4-step random access completed by the terminal device is relatively high. During the 2-step random access, after transmitting the preamble sequence, the terminal device can directly perform uplink data transmission without waiting for the response message that is for the preamble sequence sent by the terminal device and that is sent by the network device. The msgA carries a relatively small service data packet to ensure data transmission reliability. A transmission latency of the 2-step random access completed by the terminal device is relatively low.

PUSCH: A physical uplink shared channel is used to carry uplink service data. In a random access procedure, the terminal device may send, based on information indicated by the network device, a radio resource control (RRC) connection request message on the PUSCH, to request to establish an RRC connection to a network. In the solutions of this application, meanings of sending a PUSCH and sending uplink data are the same. To be specific, the terminal device sends, on a predetermined PUSCH resource, the uplink data used for random access, where the uplink data may include RRC information such as a request used for random access connection establishment. There is a correspondence between the uplink data carried on the PUSCH resource and a preamble sequence carried on a PRACH resource.

PRACH: A physical random access channel is used to carry a preamble sequence sent by the terminal device to the network device before the terminal device starts to initiate data transmission. For example, the terminal device may send, based on information indicated by the network device, the preamble sequence on the PRACH, where the preamble sequence is used by the network device for random access request identification, and uplink synchronization adjustment and measurement. In the solutions of this application, meanings of sending a PRACH, sending a preamble sequence, and sending a preamble are the same. To be specific, the terminal device sends, on a predetermined PRACH resource, the preamble sequence used for random access.

SSB: In 5G NR, one SSB includes a primary synchronization signal (PSS), a secondary synchronization signal (SSS), and a physical broadcast channel (PBCH). The SSB may occupy four orthogonal frequency division multiplexing (OFDM) symbols in time domain, and may occupy 240 subcarriers in frequency domain. In other words, the SSB may occupy 20 physical resource blocks (PRB), and one PRB occupies 14 subcarriers in frequency domain. Any common resource block that partially or completely overlaps an SSB may be considered as being occupied and is not used for PDSCH or PDCCH transmission.

Reference signal received power (RSRP): The RSRP is a key parameter that can represent radio signal strength in a network, is one of physical layer measurement requirements, and is an average value of signal received powers on all resource elements (RE) that are in a symbol and that carry a reference signal.

The embodiments of this application may be used in a random access procedure in a 5G NR scenario, or may be used in a random access scenario in another communications system.

Figure 3:
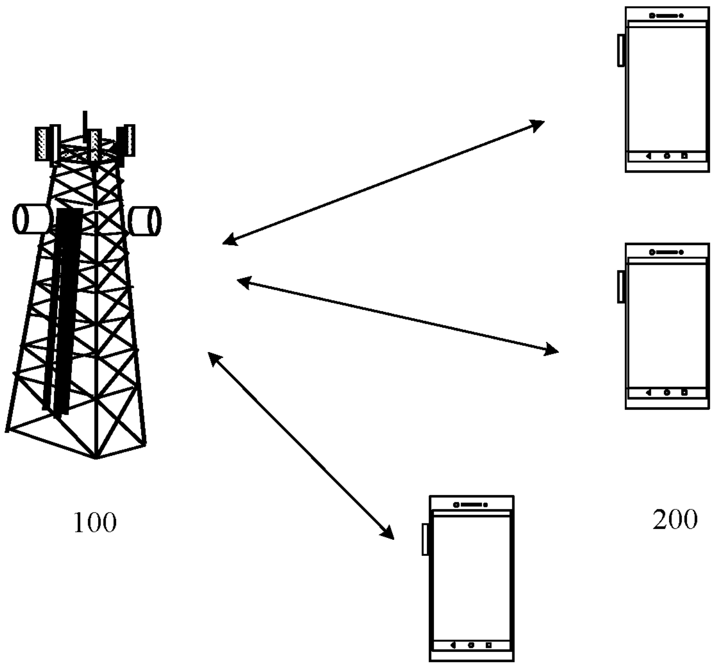
FIG. 3 is a schematic diagram of a network architecture according to an embodiment of this application.

As shown in FIG. 3, a network architecture in this application may include a network device 100 and a terminal device 200.

The network device 100 may be a device that can communicate with the terminal device. For example, the network device 100 may be a base station, and the base station may be a relay station, an access point, or the like. The base station may be an eNB or an evolved NodeB (evolutional NodeB) in LTE. Alternatively, the base station 100 may be a radio controller in a cloud radio access network (CRAN) scenario. Alternatively, the base station 100 may be a network device in a 5G network, or a network device in a future evolved public land mobile network (PLMN); or may be a wearable device, a vehicle-mounted device, or the like.

The terminal device 200 may be user equipment (UE), an access terminal, a UE unit, a UE station, a mobile station, a mobile, a remote station, a remote terminal, a mobile device, a UE terminal, a terminal, a wireless communications device, a UE agent, a UE apparatus, or the like. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal in a 5G network, a terminal in a future evolved PLMN network, or the like.

Figure 4:
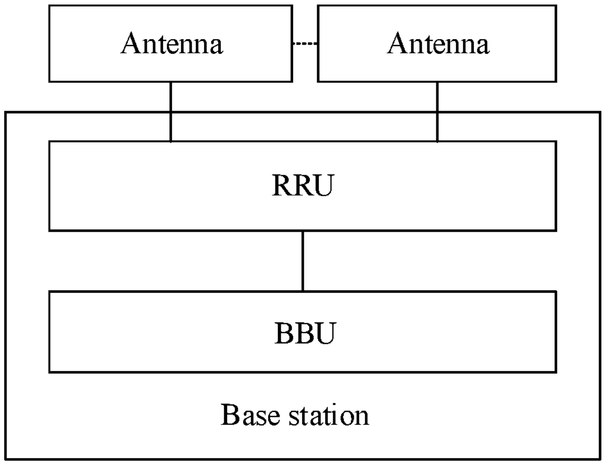
FIG. 4 is a schematic structural diagram of a network device according to an embodiment of this application.

In an example, the network device 100 may be implemented by using a structure shown in FIG. 4. FIG. 4 shows a universal hardware architecture of a base station. The base station shown in FIG. 4 may include a building baseband unit (BBU) and a remote radio unit (RRU). The RRU is connected to an antenna feeder system (namely, an antenna). The BBU and the RRU may be separately used as needed. It should be noted that, in a specific implementation process, the base station 100 may alternatively use another universal hardware architecture, and is not limited to the universal hardware architecture shown in FIG. 4.

Figure 5:
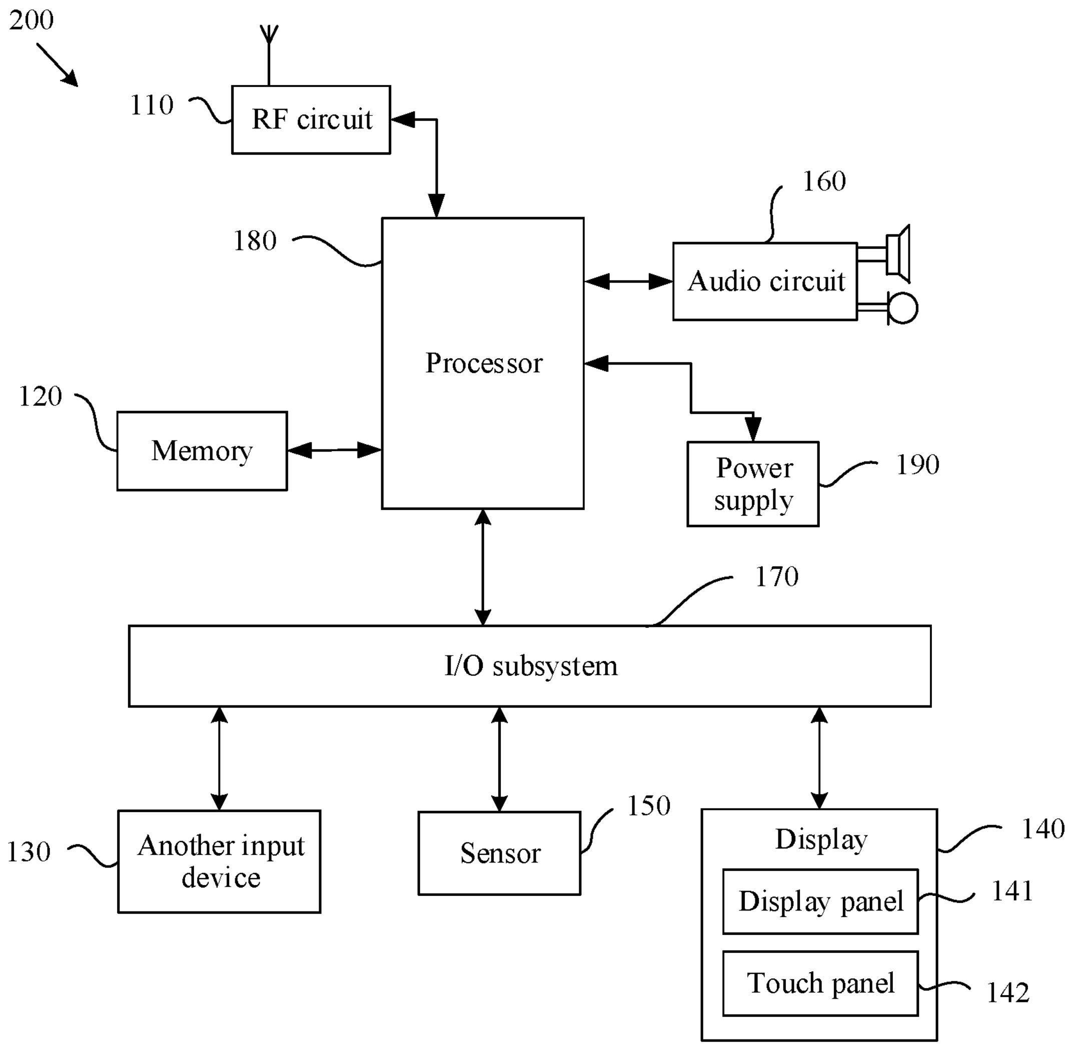
FIG. 5 is a schematic structural diagram of a terminal device according to an embodiment of this application.

In an example, the terminal device 200 may be implemented by using a structure shown in FIG. 5. For example, the terminal device 200 is a mobile phone, and FIG. 5 shows a universal hardware architecture of the mobile phone for description. The mobile phone shown in FIG. 5 may include components such as a radio frequency (radio Frequency, RF) circuit 110, a memory 120, another input device 130, a display 140, a sensor 150, an audio circuit 160, an I/O subsystem 170, a processor 180, and a power supply 190. A person skilled in the art may understand that the structure of the mobile phone shown in FIG. 4 does not constitute any limitation on the mobile phone, and may include more or fewer components than those shown in the figure, or some components may be combined, or some components may be split, or different component arrangements may be used. A person skilled in the art may understand that the display 140 is a user interface (UI), and the display 140 may include a display panel 141 and a touch panel 142. In addition, the mobile phone may include more or fewer components than those shown in the figure. Although not shown, the mobile phone may further include functional modules or components such as a camera and a Bluetooth module. Details are not described herein.

Further, the processor 180 is separately connected to the RF circuit 110, the memory 120, the audio circuit 160, the I/O subsystem 170, and the power supply 190. The I/O subsystem 170 is separately connected to the another input device 130, the display 140, and the sensor 150. The RF circuit 110 may be configured to: receive and send a signal in information receiving and sending processes or a call process, and particularly, after receiving downlink information of the base station, send the downlink information to the processor 180 for processing. The memory 120 may be configured to store a software program and a module. The processor 180 runs the software program and the module stored in the memory 120, to perform various functional applications and data processing of the mobile phone. The another input device 130 may be configured to: receive input numeral or character information, and generate a keyboard signal input related to user setting and function control of the mobile phone. The display 140 may be configured to display information input by a user or information provided for a user and various menus of the mobile phone, and may further receive a user input. The sensor 150 may be an optical sensor, a motion sensor, or another sensor. The audio circuit 160 may provide an audio interface between a user and the mobile phone. The I/O subsystem 170 is configured to control an external input/output device, and the external device may include an input controller, a sensor controller, and a display controller of another device. The processor 180 is a control center of the mobile phone 200, connects various parts of the entire mobile phone through various interfaces and lines, and performs various functions and data processing of the mobile phone 200 by running or executing the software program and/or the module stored in the memory 120 and invoking data stored in the memory 120, to perform overall monitoring on the mobile phone. The power supply 190 (for example, a battery) is configured to supply power to the foregoing components. Preferably, the power supply may be connected to the processor 180 by using a power supply management system, to implement functions such as charging management, discharging management, and power consumption management by using the power supply management system.

In this embodiment of this application, the RF circuit 110 may be configured to receive configuration information sent by the network device, where the configuration information includes at least one threshold. The processor 180 may be configured to: determine a random access type and a reference signal based on the configuration information, and determine one random access transmission occasion based on the determined reference signal. The RF circuit 110 may be further configured to send a message of the random access type on the random access transmission occasion.

In this embodiment of this application, the memory 120 may be configured to store the configuration information.

Methods in the following embodiments may all be implemented by the network device 100 and the terminal device 200 that have the foregoing hardware structures. In the following embodiments, the network device and the terminal device are used as examples to describe the methods in the embodiments of this application.

The foregoing network architecture is used. When the terminal device supports both the two random access manners: 2-step random access and 4-step random access, and when the terminal device initiates random access, the terminal device needs to consider how to select one random access manner from the 2-step random access and the 4-step random access. In addition, in a random access procedure, when the terminal device needs to initiate new random access because a current random access procedure fails, the terminal device also needs to consider whether to reselect one random access manner from the 2-step random access and the 4-step random access. This application is used to describe how the terminal device selects the random access manner when the terminal device supports both the two random access manners: the 2-step random access and the 4-step random access.

Figure 6:
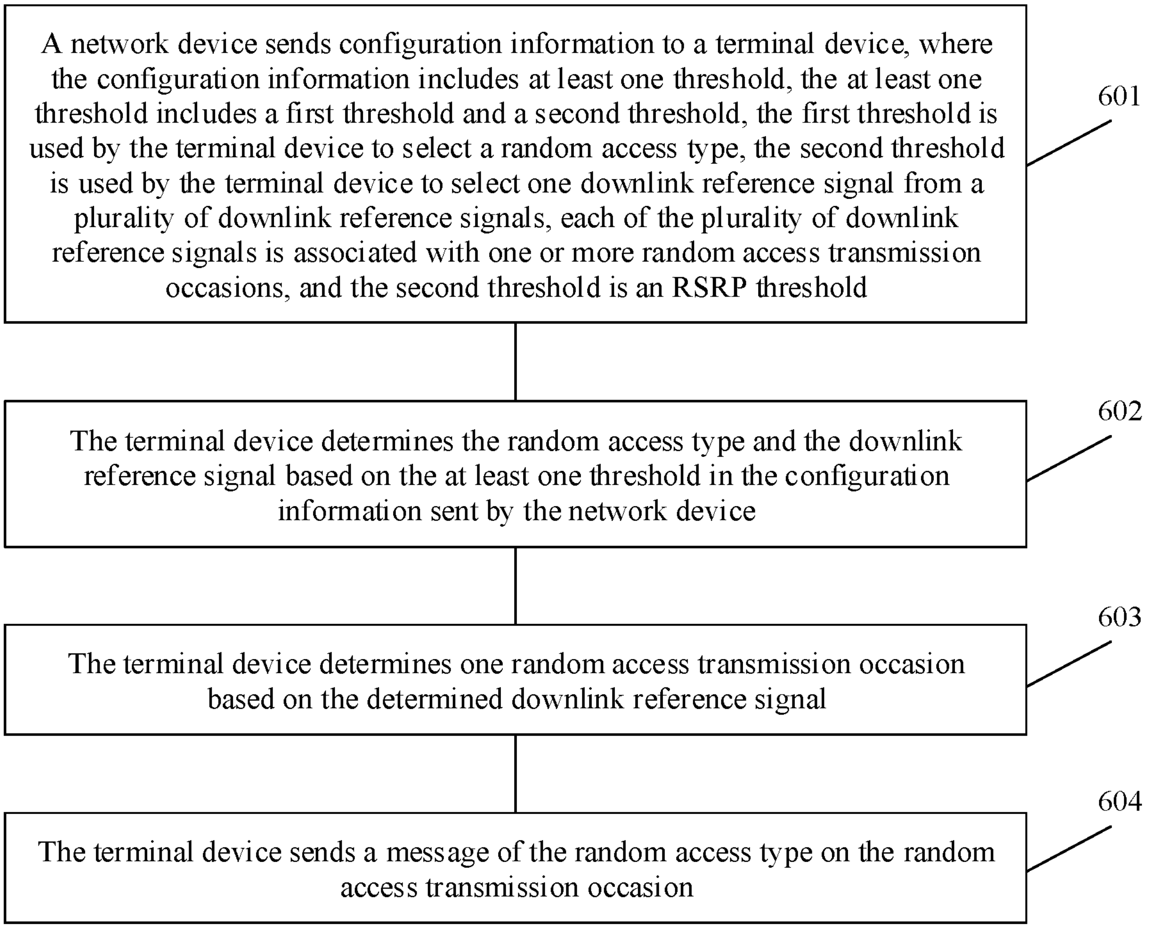
FIG. 6 is a flowchart of a random access method according to an embodiment of this application.

To resolve this problem, in the embodiments of this application, a random access type and a downlink reference signal associated with a transmission occasion may be determined based on at least one threshold configured by the network device. Therefore, an embodiment of this application provides a random access method. As shown in FIG. 6, the method includes the following steps.

601: A network device sends configuration information to a terminal device, where the configuration information includes at least one threshold, the at least one threshold includes a first threshold and a second threshold, the first threshold is used by the terminal device to select a random access type, the second threshold is used by the terminal device to select one downlink reference signal from a plurality of downlink reference signals, each of the plurality of downlink reference signals is associated with one or more random access transmission occasions, and the second threshold is an RSRP threshold. The configuration information may further include another random access parameter required by the terminal. Four transmission steps in 4-step random access are reduced to two transmission steps in 2-step random access. Therefore, a requirement on a network status in the 2-step random access procedure is higher than that in the 4-step random access. Therefore, in this application, the threshold may be delivered to the terminal device, so that the terminal device selects the 2-step random access or the 4-step random access based on the threshold, and selects, based on the threshold, the downlink reference signal used for transmitting uplink data.

In this embodiment of this application, the configuration information may be included in a system message periodically sent by the network device.

In this embodiment of this application, the random access type may be the foregoing 2-step random access or 4-step random access.

In this embodiment of this application, the first threshold may be at least one of the following thresholds: an RSRP threshold, a threshold of a size of to-be-transmitted uplink data, a network status indication value, and a threshold of a time difference between a first random access transmission occasion and a second random access transmission occasion associated with a same downlink reference signal. The first random access transmission occasion and the second random access transmission occasion correspond to different random access types. Certainly, the first threshold may alternatively be a threshold of another parameter. This is not limited in this application. The second threshold may be an RSRP threshold, of a downlink reference signal, used for downlink reference signal selection.

In this embodiment of this application, when one downlink reference signal is selected from a plurality of downlink reference signals, the plurality of downlink reference signals may be downlink reference signals sent by the network device, the selected downlink reference signal may be a downlink reference signal that is selected from the plurality of downlink reference signals sent by the network device and that is used to determine an uplink transmission time/frequency resource (for example, a random access transmission occasion).

In this embodiment of this application, the downlink reference signal may be any downlink reference signal, for example, a synchronization signal block, or a channel state information-reference signal. In this embodiment of this application, an example in which the downlink reference signal is an SSB is used for description. When the downlink reference signal is an SSB, the second threshold may be an RSRP threshold of the SSB.

The configuration information may further include information used to configure an association relationship between an SSB and a random access transmission occasion (PRACH occasion, RO) of uplink transmission. After selecting the SSB, the terminal device may determine the RO based on the association relationship, to send a random access message to the network device on the RO, that is, to send a PRACH.

602: The terminal device determines the random access type and the downlink reference signal based on the at least one threshold in the configuration information sent by the network device.

In this embodiment of this application, in the random access procedure, the terminal device may combine random access type selection and SSB selection together to determine the random access type and the SSB. Alternatively, in the random access procedure, the terminal device first performs the SSB selection, and then performs the random access type selection. Alternatively, in the random access procedure, the terminal device first performs the random access type selection, and then performs the SSB selection.

603: The terminal device determines one random access transmission occasion based on the determined downlink reference signal.

604: The terminal device sends a random access message of the random access type on the random access transmission occasion.

If the random access type determined in step 602 is the 2-step random access, the terminal device sends the PRACH and a PUSCH respectively on a random access transmission occasion supporting the 2-step random access and on an uplink data transmission occasion corresponding to the random access transmission occasion. If the random access type determined in step 602 is the 4-step random access, the terminal device sends the PRACH on a random access transmission occasion supporting the 4-step random access.

Figure 7:
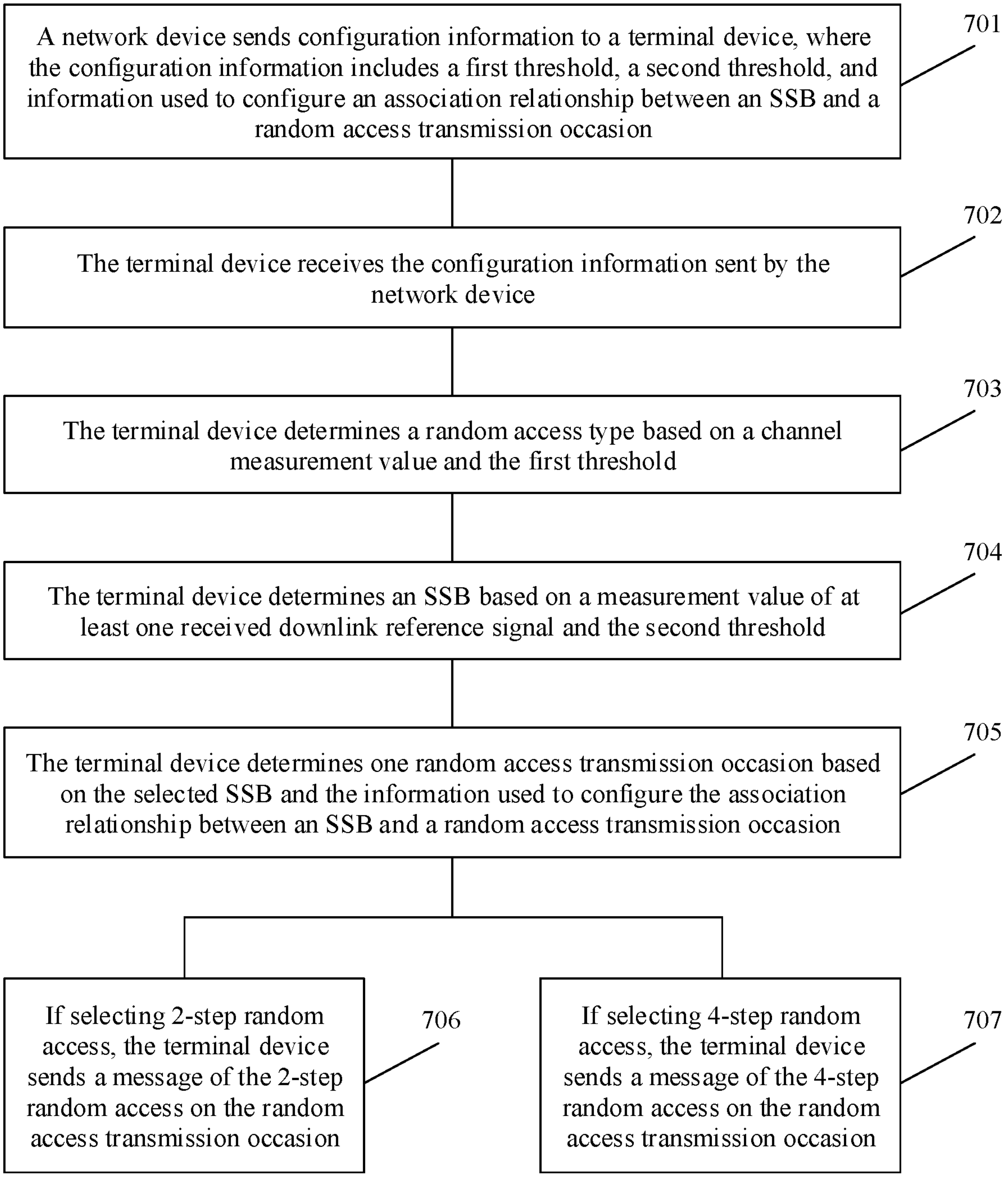
FIG. 7 is a flowchart of a random access method according to an embodiment of this application.

In this embodiment of this application, the terminal device can flexibly select the random access type based on the threshold configured by the network device, so that a success rate and efficiency of random access are improved. An example in which the terminal device first performs the random access type selection, and then performs the SSB selection is used for description. An embodiment of this application provides a random access method. As shown in FIG. 7, the method includes the following steps.

701: A network device sends configuration information to a terminal device, where the configuration information includes a first threshold, a second threshold, and information used to configure an association relationship between an SSB and a random access transmission occasion. The configuration information may further include another random access parameter required by the terminal.

In this embodiment of this application, the first threshold is a threshold used to select a random access type. When a type of the first threshold is an RSRP threshold, the first threshold is denoted as rsrp-threshold-ratype in this embodiment of this application. The second threshold is a threshold used to select the SSB, and the second threshold is denoted as rsrp-threshold-SSB in this embodiment of this application.

After the terminal determines that the random access type is 2-step random access or 4-step random access, the second threshold may be the same or different for the 2-step random access or the 4-step random access.

For example, the network device configures one rsrp-threshold-SSB applicable to both SSB selection performed when the terminal device determines the 2-step random access and SSB selection performed when the terminal device determines the 4-step random access. Alternatively, the network device configures a threshold 2step-rsrp-threshold-SSB used for SSB selection performed when the 2-step random access is determined and a threshold 4step-rsrp-threshold-SSB used for SSB selection performed when the 4-step random access is determined. If the network device does not configure 2step-rsrp-threshold-SSB, the terminal device may use 4step-rsrp-threshold-SSB to select the SSB. Alternatively, the network device configures the threshold 4step-rsrp-threshold-SSB used for the SSB selection performed when the 4-step random access is determined and an offset value A2step that is of the threshold used for the SSB selection performed when the 2-step random access is determined and that is relative to the threshold 4step-rsrp-threshold-SSB used for the SSB selection performed when the 4-step random access is determined. To be specific, the network device configures 4step-rsrp-threshold-SSB, and also configures the offset value A2step of 2step-rsrp-threshold-SSB relative to 4step-rsrp-threshold-SSB. In this case, a value of 2step-rsrp-threshold-SSB may be 4step-rsrp-threshold-SSB+A2step.

It should be noted that, in this embodiment of this application, names of threshold parameters: rsrp-threshold-ratype, rsrp-threshold-SSB, 2step-rsrp-threshold-SSB, 4step-rsrp-threshold-SSB, rsrp-threshold-2step, threshold-ratype, and rsrp-thresholdSSB-2step are merely used to denote different thresholds, and do not constitute a limitation on the names of the thresholds in this embodiment of this application.

702: The terminal device receives the configuration information sent by the network device.

703: The terminal device determines the random access type based on a channel measurement value and the first threshold.

When initiating random access, the terminal device first performs initialization of a random access procedure. In the random access initialization procedure, the terminal device selects a carrier type based on an RSRP. Specifically, the terminal device may select a carrier link based on an RSRP value of a downlink reference signal SSB and a threshold rsrp-thresholdSSB-SUL that is configured by the network device and that is used for supplementary uplink (supplementary UP link, SUL) selection. For example, if the RSRP value of the SSB is less than or equal to the threshold rsrp-thresholdSSB-SUL, the terminal device selects an SUL as the carrier link in the random access procedure; or if the RSRP value of the SSB is greater than the threshold rsrp-thresholdSSB-SUL, the terminal device selects a normal uplink (normal UP link, NUL) as the carrier link in the random access procedure.

The terminal device may determine the random access type in the random access initialization procedure. In the random access initialization procedure, if the terminal device receives random access type indication information sent by the network device, the terminal device may directly determine the random access type based on the indication information, and then perform step 704. The random access type indication information may be carried in the configuration information sent by the network device. For example, when the random access type indication information is 1, the terminal device is indicated to select the 2-step random access; or when the indication information is 0, the terminal device is indicated to select the 4-step random access.

If the terminal device does not receive the random access type indication information, in some embodiments, the terminal device may determine the random access type based on the threshold in the received configuration information in step 702.

In some embodiments, when the first threshold is the RSRP threshold rsrp-threshold-ratype, if the terminal device determines that the channel measurement value is greater than or equal to the first threshold rsrp-threshold-ratype, the terminal device may select the 2-step random access, in other words, determine that the random access manner is the 2-step random access; or if the terminal device determines that the channel measurement value is less than the first threshold rsrp-threshold-ratype, the terminal device determines that the random access manner is the 4-step random access.

The channel measurement value may be a cell-level channel measurement value $M_{rsrp\_cell}$ or an L3 higher-layer channel measurement value. For example, the channel measurement value is the cell-level channel measurement value $M_{rsrp\_cell}$. The cell-level channel measurement value may be an RSRP value for measuring cell quality, and a specific calculation manner may be calculating an average value of measurement values RSRPs of a plurality of SSBs, or a largest value of measurement values of a plurality of SSBs. Examples are as follows.

(1) If the network device configures an SSB measurement threshold thresh_ssb_consolidation and a quantity $N_{ssb}$ of SSBs used to calculate an RSRP value of the cell quality, the channel measurement value may be a channel measurement value $M_{rsrp\_cell}$ obtained based on the RSRPs of the plurality of SSBs, and is:

$$M_{rsrp\_cell} = \sum_{i=0}^{N_{ssb\_max}} \text{ssb\_rsrp}_i / N_{ssb\_max},$$

ssb_rsrp represents an RSRP value of an SSB, $N_{ssb}$ max represents a quantity of SSBs used to calculate the channel measurement value, an RSRP value of each of the $N_{ssb\_max}$ SSBs satisfies $\text{ssb\_rsrp}_i$>thresh_ssb_consolidation, and $N_{ssb\_max} \le N_{ssb}$.

(2) If the network device does not configure thresh_ssb_consolidation and $N_{ssb}$, the channel measurement value may be the largest value of the RSRP values of the plurality of SSBs. In this embodiment, after determining the random access type, the terminal device may perform initialization based on a parameter of a random access procedure of the determined type. An initialization procedure performed by the terminal device on another parameter in the random access procedure does not affect the solutions of this application. Therefore, details are not described in this embodiment. In this embodiment, SUL selection is only used as an example for description. In other words, a parameter initialization procedure in the random access procedure in this embodiment includes but is not limited to the SUL selection and random access type selection. 704: The terminal device determines an SSB based on a measurement value of at least one received downlink reference signal and the second threshold.

After completing the random access type selection during the random access initialization, the terminal device continues to perform resource selection for sending a random access message, that is, perform the SSB selection.

In some embodiments, when determining that the random access manner is the 2-step random access and determining that a measurement value of at least one received SSB is greater than or equal to the second threshold, the terminal device may determine one SSB from the at least one SSB, for example, select any SSB from the at least one SSB; otherwise, the terminal device selects any SSB, to be specific, if measurement values of all SSBs received by the terminal device are less than the second threshold, the terminal device selects any SSB from all the SSBs. The second threshold may be a second threshold corresponding to the 2-step random access, that is, 2step-rsrp-threshold-SSB mentioned above.

In some embodiments, when determining that the random access manner is the 4-step random access and determining that a measurement value of at least one received SSB is greater than or equal to the second threshold, the terminal device may determine one SSB from the at least one SSB, for example, select any SSB from the at least one SSB; otherwise, the terminal device selects any SSB, to be specific, if measurement values of all SSBs received by the terminal device are less than the second threshold, the terminal device selects any SSB from all the SSBs. The second threshold may be a second threshold corresponding to the 4-step random access, that is, 4step-rsrp-threshold-SSB mentioned above.

705: The terminal device determines one random access transmission occasion based on the selected SSB and the information used to configure the association relationship between an SSB and a random access transmission occasion, and then performs step 706 or step 707.

706: If selecting the 2-step random access, the terminal device sends a message of the 2-step random access on the random access transmission occasion.

To be specific, if selecting the 2-step random access, the terminal device may send a preamble sequence on a PRACH transmission occasion associated with the SSB, and send uplink data on a PUSCH transmission occasion corresponding to the PRACH transmission occasion. The terminal device then receives at least one of response information for the PRACH and a response message for a PUSCH.

707: If selecting the 4-step random access, the terminal device sends a message of the 4-step random access on the random access transmission occasion.

To be specific, if selecting the 4-step random access, the terminal device may send a preamble sequence on a PRACH transmission occasion associated with the SSB. The terminal device then receives a response message for a PRACH.

In the foregoing embodiment, a process in which the terminal device first performs the random access type selection and then performs the SSB selection in the random access procedure is described. The terminal device determines the random access type and the SSB by using two thresholds, and this makes a relatively small modification to a current protocol.

It may be understood that, in this embodiment, the cell quality measurement value required by the terminal device during the random access type selection is, for example, obtained by averaging measurement values RSRPs of a plurality of SSBs in a long term, and the measurement values RSRPs required by the terminal device during the SSB selection are instantaneous RSRP values corresponding to different SSBs.

Figure 8A:
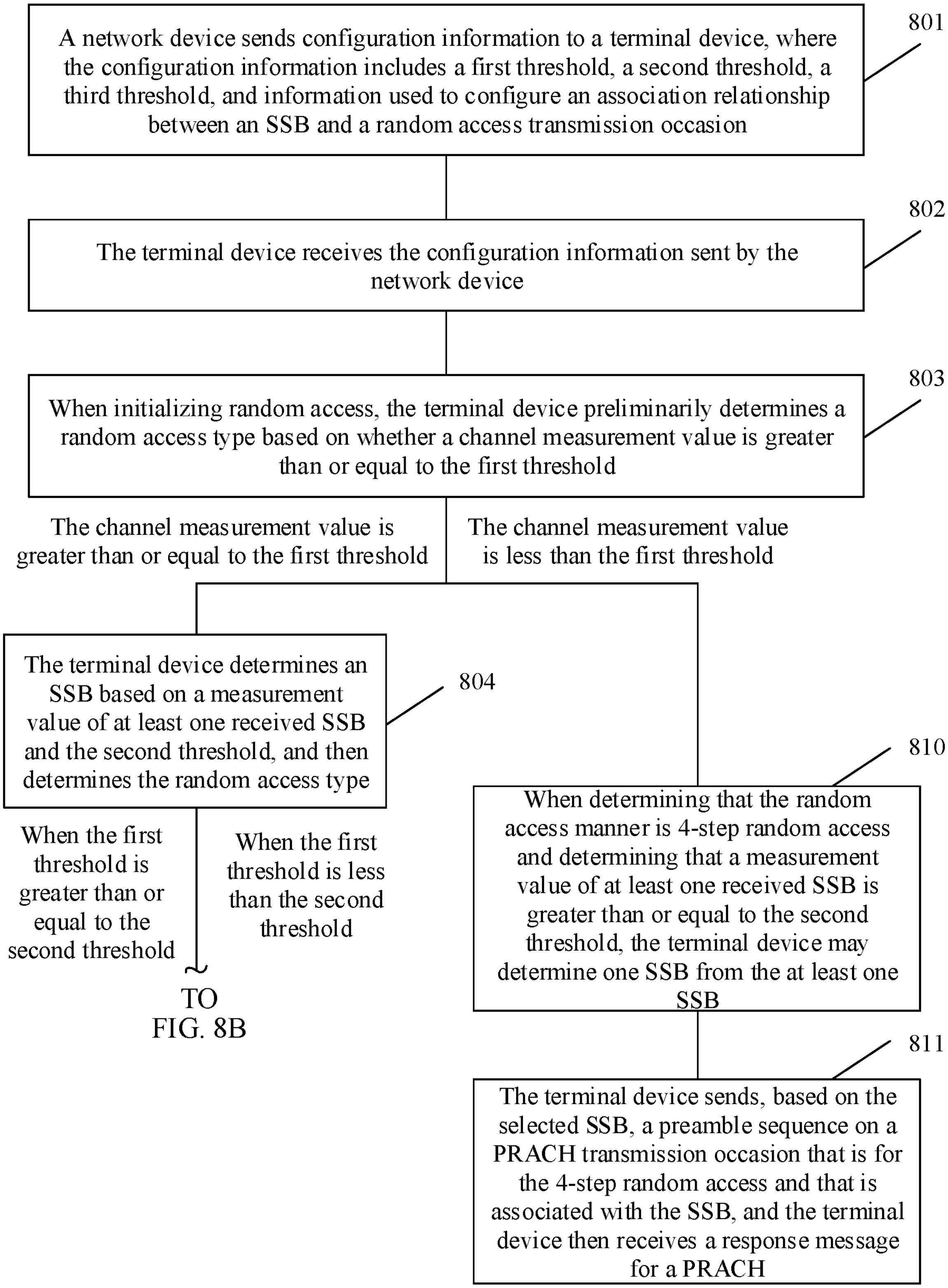
FIG. 8A and FIG. 8B are a flowchart of a random access method according to an embodiment of this application.
Figure 8B:
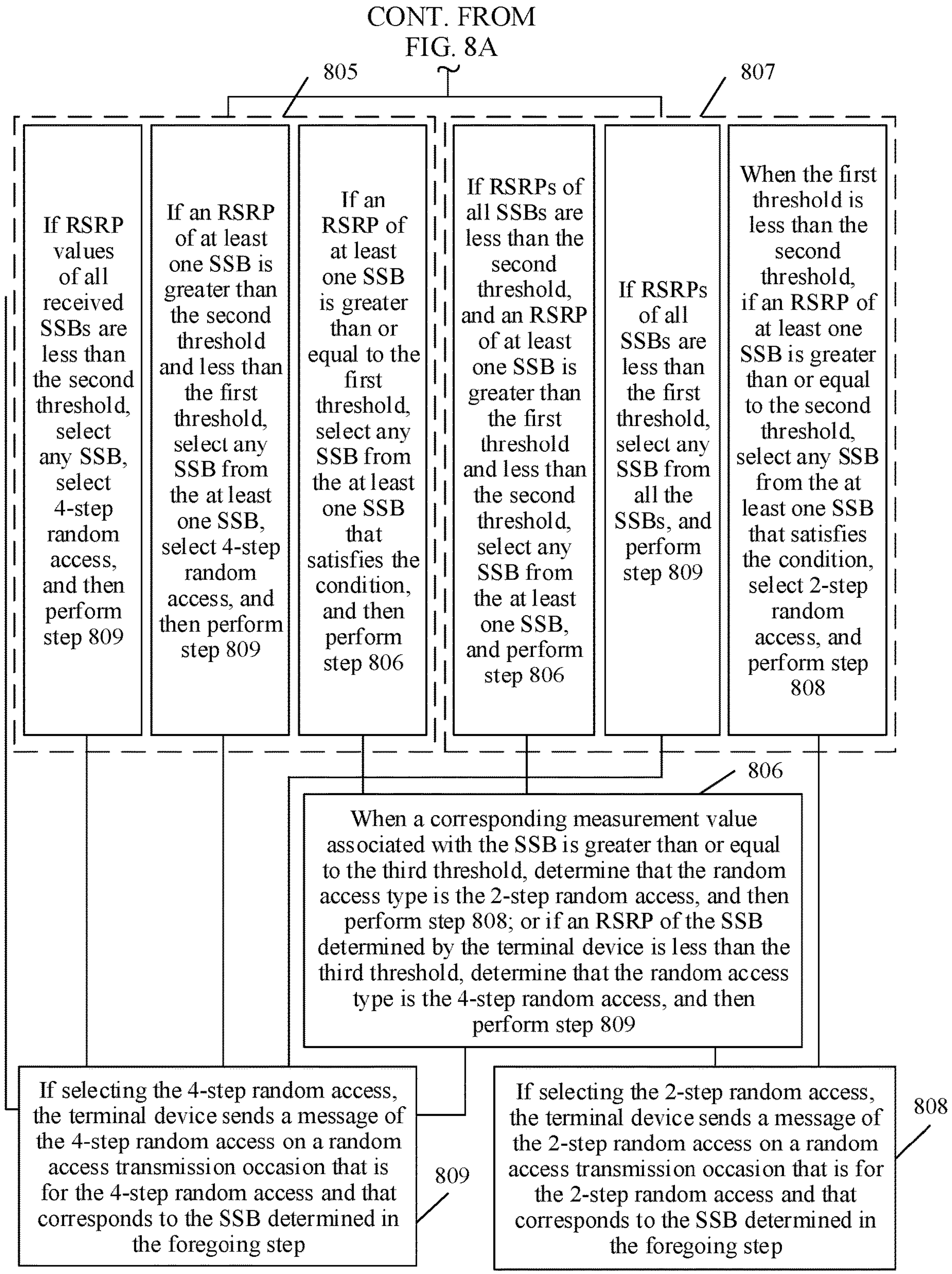

For the case in which the terminal device first performs the random access type selection, and then performs the SSB selection, an embodiment of this application further provides a random access manner. As shown in FIG. 8A and FIG. 8B, the method includes the following steps.

801: A network device sends configuration information to a terminal device, where the configuration information includes a first threshold, a second threshold, a third threshold, and information used to configure an association relationship between an SSB and a random access transmission occasion. The configuration information may further include another random access parameter required by the terminal.

The first threshold may be a threshold rsrp-threshold-2step used to determine whether the terminal device supports 2-step random access, the second threshold may be an RSRP threshold rsrp-threshold-SSB used by the terminal device for SSB selection, and the third threshold may be a threshold threshold-ratype used to determine a random access type. The second threshold can be used for both the 2-step random access and 4-step random access, that is, the network device configures one threshold used for the SSB selection.

802: The terminal device receives the configuration information sent by the network device.

803: When initializing random access, the terminal device preliminarily determines the random access type based on whether a channel measurement value is greater than or equal to the first threshold.

An implementation in which the terminal device selects a carrier type in a random access initialization procedure is similar to that in the foregoing embodiment. To be specific, in the random access initialization procedure, if the terminal device receives random access type indication information sent by the network device, the terminal device may directly determine the random access type based on the indication information. For subsequent execution process, refer to the execution process after step 704 (including step 704) in the embodiment corresponding to FIG. 7. Details are not described herein again. The random access type indication information may be carried in the configuration information sent by the network device. For example, when the random access type indication information is 1, the terminal device is indicated to select the 2-step random access; or when the indication information is 0, the terminal device is indicated to select the 4-step random access.

If the terminal device does not receive the random access type indication information sent by the network device, the terminal device continues to perform step 803.

If the channel measurement value is greater than or equal to the first threshold rsrp-threshold-2step, it indicates that a current channel condition is good, and the terminal device may select the 2-step random access, or may select the 4-step random access, and then perform step 804. If the channel measurement value is less than the first threshold rsrp-threshold-2step, it indicates that a current channel condition does not support the 2-step random access, and the terminal device determines that the random access type is the 4-step random access, and then performs step 810.

For obtaining of the channel measurement value, refer to the implementation in step 703. Details are not described herein again.

804: The terminal device determines an SSB based on a measurement value of at least one received SSB and the second threshold, and then determines the random access type.

A value relationship between the first threshold rsrp-threshold-2step and the second threshold rsrp-threshold-SSB that are configured by the network device affects a result of random access type selection and the SSB selection of the terminal device. Therefore, the method further includes: The terminal device determines the value relationship between the first threshold rsrp-threshold-2step and the second threshold rsrp-threshold-SSB. If the first threshold is greater than or equal to the second threshold, the terminal device continues to perform step 805; or if the first threshold is less than the second threshold, the terminal device performs step 807.

805: When the first threshold is greater than or equal to the second threshold, the terminal device selects one SSB from all received SSBs based on RSRP values of all the SSBs, and the first threshold and the second threshold that are configured by the network device, to determine the random access type.

For example, when the first threshold rsrp-threshold-2step≥the second threshold rsrp-threshold-SSB,

- if an RSRP value $M_{rsrp}$ of at least one SSB in the SSBs received by the terminal device satisfies a condition: $M_{rsrp}$≤rsrp-threshold-2step, the terminal device selects any SSB in the at least one SSB, and the terminal device may select the 2-step random access, or may select the 4-step random access, and then perform step 806;
- in some embodiments, if an RSRP value $M_{rsrp}$ of at least one SSB in the SSBs received by the terminal device satisfies a condition: rsrp-threshold-SSB<Mrsp<rsrp-threshold-2step, the terminal device selects any SSB from the at least one SSB that satisfies the condition, selects the 4-step random access, and then performs step 809; or
- in some embodiments, if determining that the RSRP values of all the received SSBs are less than rsrp-threshold-SSB, the terminal device selects any SSB from all the SSBs, selects the 4-step random access, and then performs step 809.

806: After determining one SSB in step 805, if a corresponding measurement value associated with the SSB is greater than or equal to the third threshold, the terminal device determines that the random access type is the 2-step random access, and then performs step 808; or if an RSRP of the SSB determined by the terminal device is less than the third threshold, the terminal device determines that the random access type is the 4-step random access, and then performs step 809.

For example, if the network device further configures the third threshold threshold-ratype in the configuration information, when determining that the corresponding measurement value associated with the SSB selected in step 805 is greater than or equal to the third threshold threshold-ratype, the terminal device selects the 2-step random access; or if the corresponding measurement value associated with the SSB selected in step 805 is less than the third threshold threshold-ratype, the terminal device selects the 4-step random access.

In some embodiments, if the network device does not configure the third threshold, after determining the SSB according to step 805, the terminal device may select any random access type.

In this step, a data type of the measurement value associated with the SSB is the same as that of the third threshold.

In this embodiment, when a value of the third threshold may be a threshold of a size of to-be-transmitted uplink data, when the terminal device transmits a PUSCH payload (PUSCH payload), and when the to-be-transmitted PUSCH payload is less than or equal to a threshold of the PUSCH payload, in other words, when a size of a PUSCH data packet is less than or equal to a size threshold of the PUSCH data packet, the terminal device may select the 2-step random access suitable for transmitting a small data packet. Correspondingly, if the PUSCH payload to be transmitted by the terminal device is greater than the threshold of the PUSCH payload, the terminal device selects the 4-step random access suitable for transmitting a large data packet. It should be understood that the configured PUSCH payload is used to describe a size of a data packet carried on a PUSCH. For example, the data packet is a transport block (transport block, TB). Because the to-be-transmitted data packet is related to a resource size and a code rate of the PUSCH, for example, related to a modulation and coding scheme (Modulation and Coding Scheme, MCS), equivalently, in actual network configuration, a resource block size or an index of the MCS that are of the PUSCH may alternatively be used to describe the configured PUSCH payload. In addition, to reduce overheads of configuration information of the network, a description of the PUSCH payload may alternatively be configured based on a level. For example, a PUSCH payload corresponding to a level 0 (level 0) may be not greater than 56 bits, and a PUSCH payload corresponding to a level 1 is not greater than 72 bits.

In some embodiments of this application, the third threshold may alternatively be a threshold of a time difference between a first random access transmission occasion and a second random access transmission occasion associated with a same downlink reference signal, and the first random access transmission occasion and the second random access transmission occasion correspond to different random access types. For example, if a reference time point corresponding to a transmission occasion that is for the 2-step random access and that is associated with the SSB selected by the terminal device is X1, and a reference time point corresponding to a transmission occasion that is for the 4-step random access and that is associated with the SSB is X2, a time difference between X1 and X2 is denoted as X1-X2. If a value of X1-X2 is greater than or equal to the threshold of the time difference, the terminal device may determine that the random access type is the 2-step random access; otherwise, the terminal device determines that the random access type is still the 4-step random access. The reference time point is a reference location selected for comparison, for example, may be a start symbol or an end symbol of the transmission occasion, a start symbol or an end symbol of a preamble in a random access message, a start symbol or an end symbol of a payload in a random access message, a start symbol or an end symbol of random access response information corresponding to a msgB, a start symbol or an end symbol of a response message (for example, a contention resolution message) that corresponds to a msgA and that is sent by the network device, or another specific location.

807: If the first threshold is less than the second threshold, the terminal device selects one SSB from all the SSBs based on the RSRP values of all the received SSBs, and the first threshold and the second threshold that are configured by the network device, to determine the random access type.

For example, when the first threshold rsrp-threshold-2step<the second threshold rsrp-threshold-SSB,

- if an RSRP value $M_{rsrp}$ of at least one SSB in the plurality of SSBs received by the terminal device satisfies a condition: $M_{rsmp}$≥rsrp-threshold-SSB, it indicates that a network status is good, and the terminal device may select any SSB from the at least one SSB that satisfies the condition, select the 2-step random access, and then perform step 808;
- in some embodiments, if RSRPs of all the SSBs received by the terminal device are less than the second threshold and an RSRP value $M_{rsrp}$ of at least one SSB satisfies a condition: rsrp-threshold-2step<$M_{rsrp}$<rsrp-thresholdSSB, the terminal device selects any SSB in the at least one SSB that satisfies the condition, and the terminal device may select the 2-step random access, or may select the 4-step random access, and the terminal device then performs step 806; or
- in some embodiments, if RSRPs of all the SSBs received by the terminal device are less than the first threshold, the terminal device selects any SSB from all the SSBs, and determines that the random access type is the 4-step random access, to be specific, if each of the RSRP values $M_{rsrp}$ of the plurality of SSBs received by the terminal device satisfy a condition: $M_{rsrp}$<rsrp-threshold-2step, the terminal device selects any SSB from the plurality of SSBs that satisfy the condition, determines that the random access type is the 4-step random access, and then performs step 809.

808: If selecting the 2-step random access, the terminal device sends a message of the 2-step random access on the random access transmission occasion that is for the 2-step random access and that corresponds to the SSB determined in the foregoing step. That is, the description is the same as that in step 706.

809: If selecting the 4-step random access, the terminal device sends a message of the 4-step random access on the random access transmission occasion that is for the 4-step random access and that corresponds to the SSB determined in the foregoing step. That is, the description is the same as that in step 707.

810: When determining that the random access manner is the 4-step random access and determining that the measurement value of the at least one received SSB is greater than or equal to the second threshold, the terminal device may determine one SSB from the at least one SSB.

For example, the terminal device selects any SSB from the at least one SSB; otherwise, the terminal device selects any SSB, to be specific, if the measurement values of all the SSBs received by the terminal device are less than the second threshold, the terminal device selects any SSB from all the SSBs. The second threshold may be the RSRP threshold rsrp-threshold-SSB that is configured by the network for the terminal in step 801 and that is used for the SSB selection.

811: The terminal device sends, based on the selected SSB, a preamble sequence on a PRACH transmission occasion that is for the 4-step random access and that is associated with the SSB, and the terminal device then receives a response message for a PRACH.

A difference between the embodiment corresponding to FIG. 7 and the embodiment corresponding to FIG. 8A and FIG. 8B is that the third threshold is added in the embodiment corresponding to FIG. 8A and FIG. 8B. A similarity is that the terminal device first performs the random access type selection, and then performs the SSB selection, so that random access type selection is more flexible, and a success rate and efficiency of random access are improved.

Figure 9A:
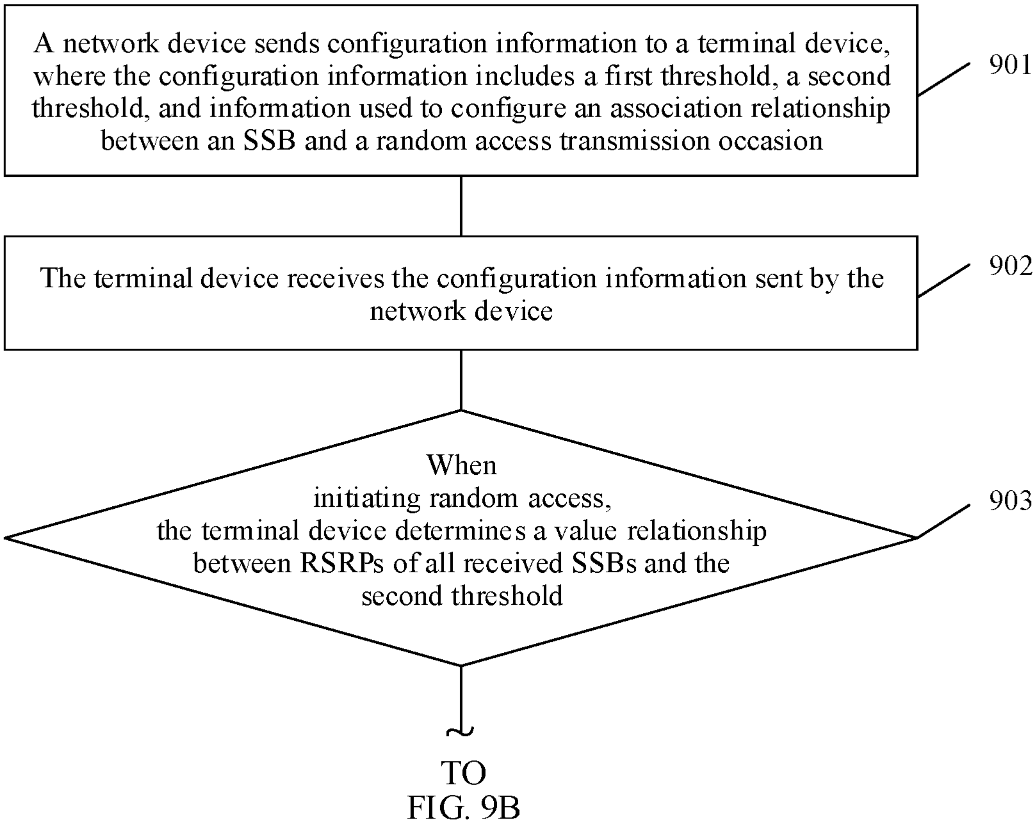
FIG. 9A and FIG. 9B are a flowchart of a random access method according to an embodiment of this application.
Figure 9B:
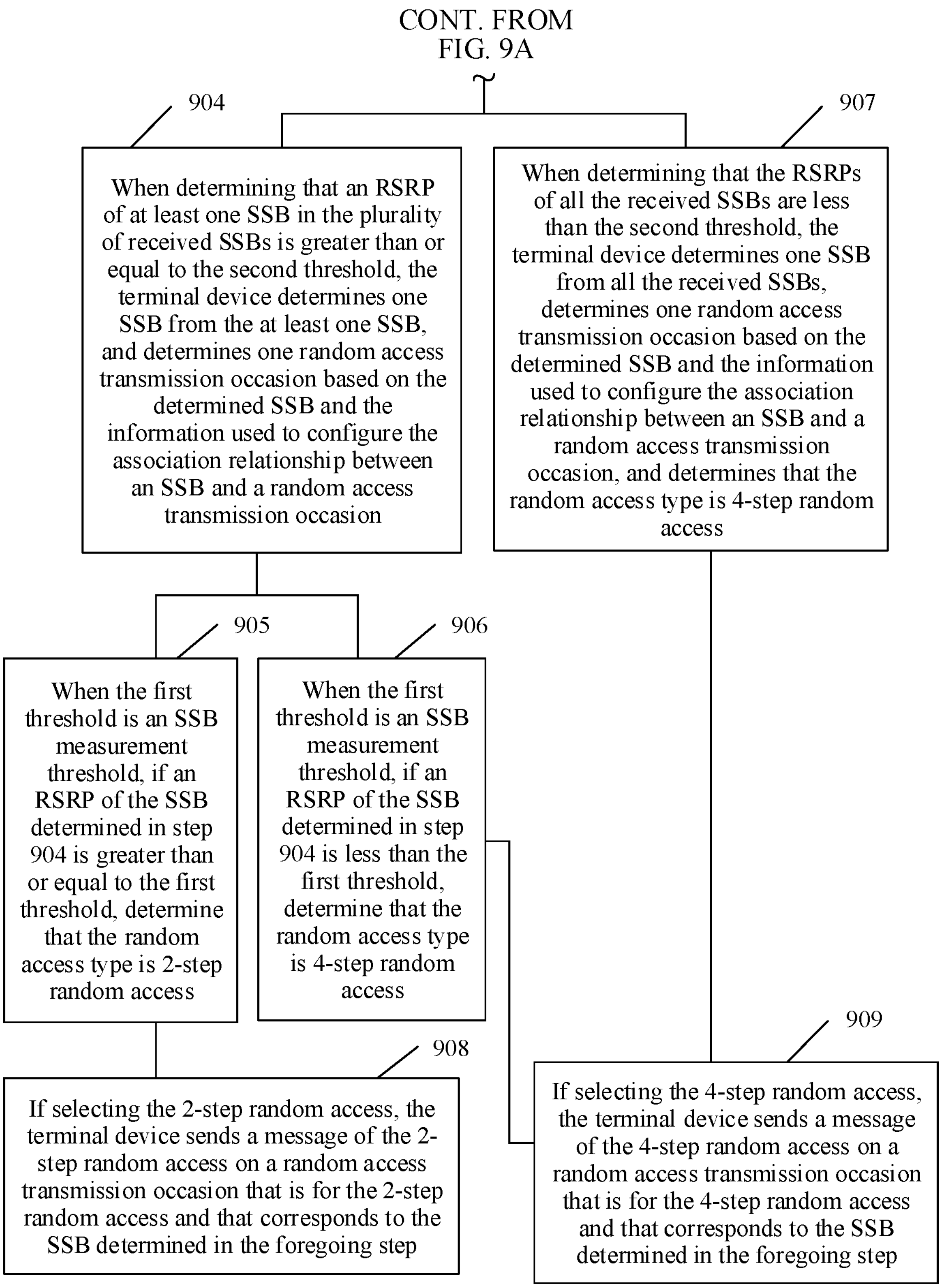

In the following embodiment, the foregoing mentioned case in which the terminal device first performs the SSB selection, and then performs the random access type selection is described. Therefore, an embodiment of this application provides a random access method. As shown in FIG. 9A and FIG. 9B, the method includes the following steps.

901: A network device sends configuration information to a terminal device, where the configuration information includes a first threshold, a second threshold, and information used to configure an association relationship between an SSB and a random access transmission occasion. The configuration information may further include another random access parameter required by the terminal.

In this embodiment of this application, the first threshold is denoted as threshold-ratype, and the second threshold is denoted as rsrp-threshold-SSB.

902: The terminal device receives the configuration information sent by the network device.

903: When initiating random access, the terminal device determines a value relationship between RSRPs of all received SSBs and the second threshold, and then performs step 904 or step 907.

904: When determining that an RSRP of at least one SSB in the plurality of received SSBs is greater than or equal to the second threshold, the terminal device determines one SSB from the at least one SSB, and determines one random access transmission occasion based on the determined SSB and the association relationship between an SSB and a random access transmission occasion. The terminal device then performs step 905 or step 906.

For example, if an RSRP value $M_{rsmp}$ of at least one SSB satisfies a condition: $M_{rsrp}$≥rsrp-threshold-SSB, the terminal device selects any SSB from the at least one SSB that satisfies the condition.

905: When the first threshold is an SSB measurement threshold, and if an RSRP of the SSB determined in step 904 is greater than or equal to the first threshold, the terminal device determines that the random access type is 2-step random access. The terminal device then performs step 908.

The SSB measurement threshold may be rsrp-threshold-2step. To be specific, if the first threshold threshold-ratype is the SSB measurement threshold rsrp-threshold-2step, and if the RSRP of the SSB determined in step 904 is greater than or equal to the first threshold rsrp-threshold-2step, the terminal device determines that the random access type is the 2-step random access.

906: When the first threshold is an SSB measurement threshold, and if an RSRP of the SSB determined in step 904 is less than the first threshold, the terminal device determines that the random access type is 4-step random access. The terminal device then performs step 909.

The SSB measurement threshold may be rsrp-threshold-2step. To be specific, if the first threshold threshold-ratype is the SSB measurement threshold rsrp-threshold-2step, and if the RSRP of the SSB determined in step 904 is less than the first threshold rsrp-threshold-2step, the terminal device determines that the random access type is the 4-step random access. In some other embodiments, the first threshold threshold-ratype in step 905 and step 906 may alternatively be a threshold of a size of to-be-transmitted uplink data. For the threshold of the size of the to-be-transmitted uplink data (the first threshold) and corresponding descriptions of step 905 and step 906, refer to the related description in step 806.

In some other embodiments, the first threshold threshold-ratype in step 905 and step 906 may alternatively be a threshold of a time difference between a first random access transmission occasion and a second random access transmission occasion associated with a same downlink reference signal. For the threshold of the time difference (the first threshold) and corresponding descriptions of step 905 and step 906, refer to the related description in step 806.

In some other embodiments, the first threshold threshold-ratype in step 905 and step 906 may alternatively be a network status indication value updated by the network device. For example, the network status indication value may be an indication value that is of a configuration such as a quantity of active users, a resource, or a capacity and that is used to determine whether the 2-step random access manner is supported. Correspondingly, step 905 and step 906 may be described as follows: If the network status indication value is 1, the terminal device may select the 2-step random access manner; otherwise, the terminal device selects the 4-step random access manner. It should be noted that, in this embodiment, there is no necessary correspondence between a value of the network status indication value and the random access type. The possible values listed in this embodiment and the corresponding random access types are used as example descriptions.

907: When determining that the RSRPs of all the received SSBs are less than the second threshold, the terminal device determines one SSB from all the received SSBs, determines one random access transmission occasion based on the determined SSB and the association relationship between an SSB and a random access transmission occasion, determines that the random access type is the 4-step random access. Then, the terminal device performs step 909.

For example, if each of the RSRP values $M_{rsrp}$ of the plurality of SSBs received by the terminal device satisfies a condition: $M_{rsrp}$<rsrp-threshold-SSB, the terminal device selects any SSB, and selects the 4-step random access.

908: If selecting the 2-step random access, the terminal device sends a message of the 2-step random access on a random access transmission occasion that is for the 2-step random access and that corresponds to the SSB determined in the foregoing step. That is, the description is the same as that in step 706.

909: If selecting the 4-step random access, the terminal device sends a message of the 4-step random access on a random access transmission occasion that is for the 4-step random access and that corresponds to the SSB determined in the foregoing step. That is, the description is the same as that in step 707.

In this embodiment of this application, the terminal device first performs the SSB selection, and then performs the random access type selection. In this way, each time the terminal device initiates random access, the terminal device may reselect the random access type and the SSB based on the threshold configured in the configuration information. This improves a success rate of random access and avoids a waste of system resources.

Figure 10:
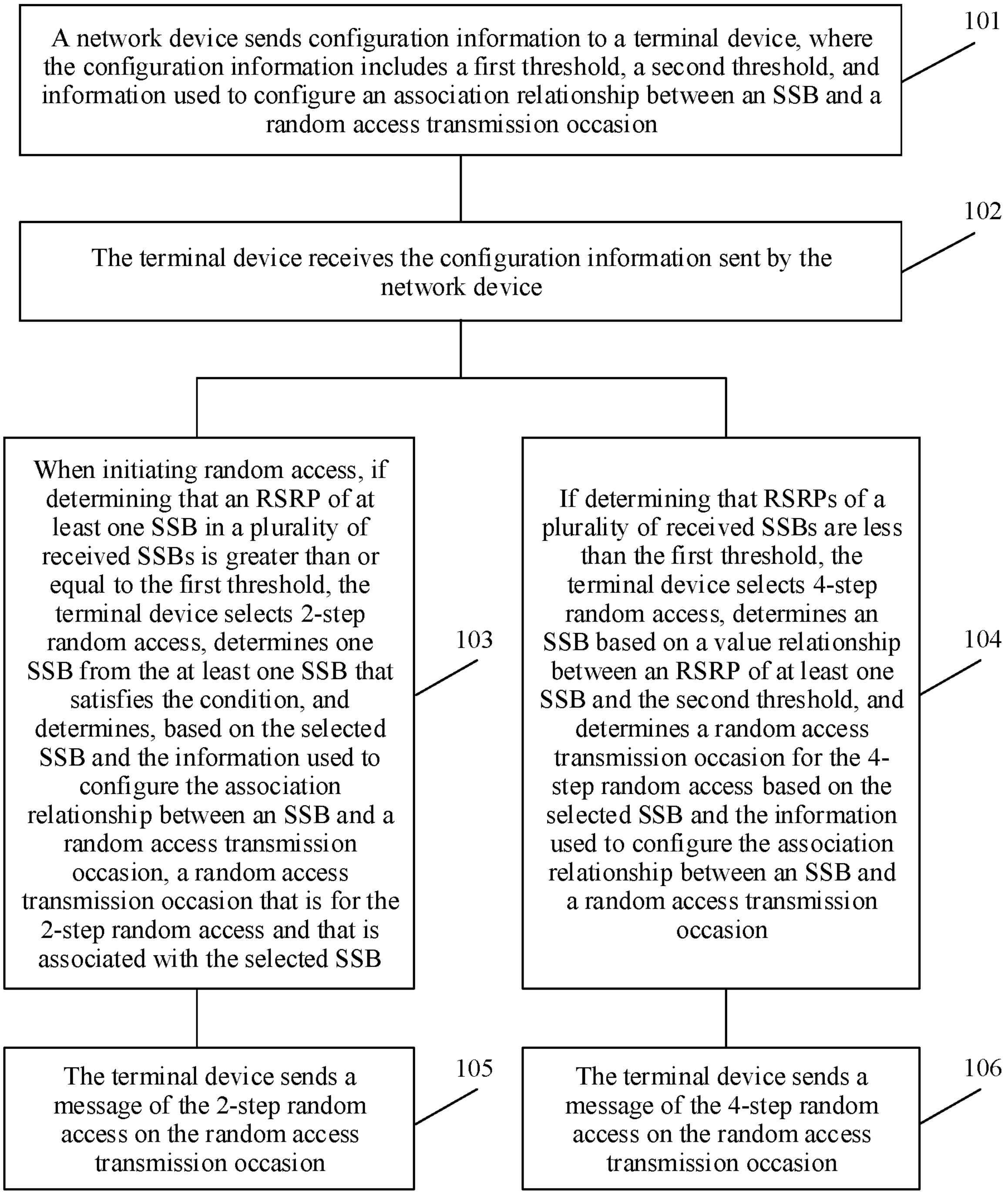
FIG. 10 is a flowchart of a random access method according to an embodiment of this application.

In the following embodiment, for the mentioned case in which the terminal device implements the random access type selection and the SSB selection together, an embodiment of this application provides a random access method. As shown in FIG. 10, the method includes the following steps.

101: A network device sends configuration information to a terminal device, where the configuration information includes a first threshold, a second threshold, and information used to configure an association relationship between an SSB and a random access transmission occasion. The configuration information may further include another random access parameter required by the terminal.

The first threshold may be rsrp-threshold-2step mentioned in the foregoing embodiment, and is used to determine whether the terminal device supports selection of 2-step random access. The second threshold may be rsrp-threshold-SSB mentioned in the foregoing embodiment.

102: The terminal device receives the configuration information sent by the network device. The terminal device then performs step 103 or 104.

103: When initiating random access, if determining that an RSRP of at least one SSB in a plurality of received SSBs is greater than or equal to the first threshold, the terminal device selects the 2-step random access, determines one SSB from the at least one SSB that satisfies the condition, and determines, based on the selected SSB and the association relationship between an SSB and a random access transmission occasion, a random access transmission occasion that is for the 2-step random access and that is associated with the selected SSB. The terminal device then performs step 105.

For example, if the terminal device determines that the RSRP value $M_{rsrp}$ of the at least one received SSB satisfies a condition 1: $M_{rsrp}\geq$rsrp-threshold-2step, it indicates that a current network status is good, and the terminal device may select the 2-step random access that has a relatively high network requirement, and select any SSB from the at least one SSB that satisfies the condition 1. The terminal device then determines, based on the association relationship, the random access transmission occasion that is for the 2-step RACH and that is associated with the selected SSB.

104: If determining that RSRPs of a plurality of received SSBs are less than the first threshold, the terminal device selects 4-step random access, determines one SSB based on a value relationship between an RSRP of at least one SSB and the second threshold, and determines a random access transmission occasion for the 4-step random access based on the selected SSB and the association relationship between an SSB and a random access transmission occasion. The terminal device then performs step 106.

For example, if the terminal device determines that the RSRP value $M_{rsrp}$ of the at least one received SSB does not satisfy a condition 1: $M_{rsrp}\geq$rsrp-threshold-2step, it indicates that a current network status is average, and the terminal device may select the 4-step random access that has a relatively low network requirement. In addition, the terminal device determines whether an RSRP $M_{rsrp}$ of at least one SSB in the plurality of SSBs satisfies a condition 2: $M_{rsrp}\geq$rsrp-thresholdSSB. If the RSRP $M_{rsrp}$ of the at least one SSB satisfies the condition 2, the terminal device may select any SSB from the at least one SSB that satisfies the condition 2. If no SSB in the plurality of SSBs satisfies the condition 2, the terminal device may select any SSB from the plurality of SSBs. The terminal device determines, based on the association relationship between an SSB and a random access transmission occasion, a random access transmission occasion that is for the 4-step RACH and that is associated with the selected SSB.

105: The terminal device sends a message of the 2-step random access on the random access transmission occasion. That is, the description is the same as that in step 706.

106: The terminal device sends a message of the 4-step random access on the random access transmission occasion. That is, the description is the same as that in step 707.

In the embodiment corresponding to FIG. 10, the network device configures two different thresholds for the random access type selection and the SSB selection. In the random access procedure, the terminal device may select a suitable SSB and a suitable random access type based on the thresholds, in other words, select a suitable SSB and a suitable random access type based on the network status. This improves a success rate of random access.

Figure 11:
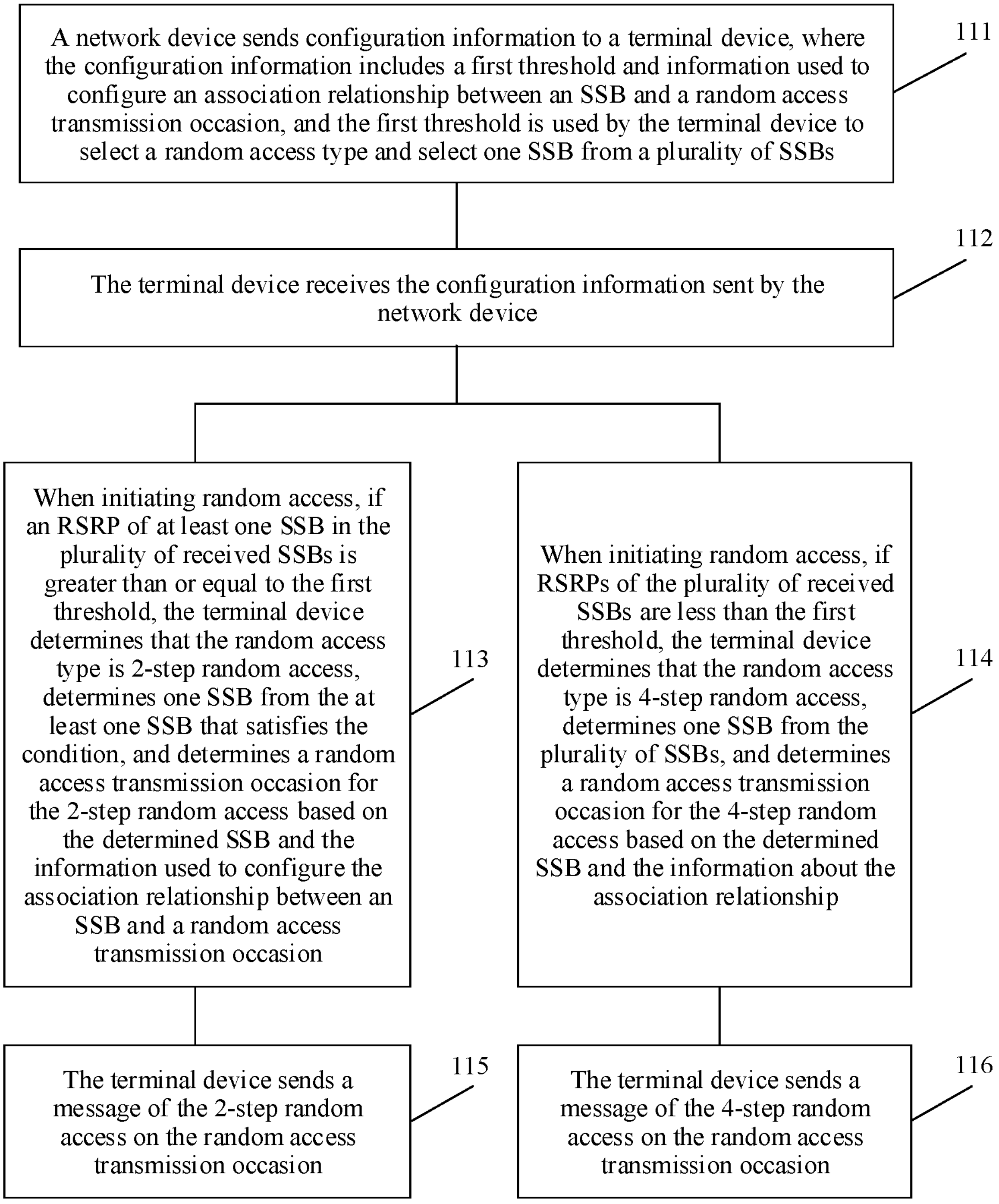
FIG. 11 is a flowchart of a random access method according to an embodiment of this application.

In some embodiments, only one threshold may be used to simplify the random access type selection and the SSB selection of the terminal device in the random access procedure, and is denoted as a first threshold rsrp-threshold-SSB-2step. The terminal device may quickly determine, based on the first threshold, the random access type and the SSB for performing random access. Therefore, an embodiment of this application further provides a random access method. As shown in FIG. 11, the method may include the following steps.

111: A network device sends configuration information to a terminal device, where the configuration information includes a first threshold and information used to configure an association relationship between an SSB and a random access transmission occasion, and the first threshold is used by the terminal device to select a random access type and select one SSB from a plurality of SSBs. The configuration information may further include another random access parameter required by the terminal.

112: The terminal device receives the configuration information sent by the network device. The terminal device then performs step 113 or step 114.

113: When initiating random access, if an RSRP of at least one SSB in the plurality of received SSBs is greater than or equal to the first threshold, the terminal device determines that the random access type is 2-step random access, determines one SSB from the at least one SSB that satisfies the condition, and determines a random access transmission occasion for the 2-step random access based on the determined SSB and the association relationship between an SSB and a random access transmission occasion. The terminal device then performs step 115.

114: When initiating random access, if RSRPs of the plurality of received SSBs are less than the first threshold, the terminal device determines that the random access type is 4-step random access, determines one SSB from the plurality of SSBs, and determines a random access transmission occasion for the 4-step random access based on the determined SSB and the association relationship. The terminal device then performs step 116.

115: The terminal device sends a message of the 2-step random access on the random access transmission occasion. That is, the description is the same as that in step 706.

116: The terminal device sends a message of the 4-step random access on the random access transmission occasion. That is, the description is the same as that in step 707.

Therefore, in the embodiment corresponding to FIG. 11, the random access type selection and the SSB selection are combined together, and a network status is determined by using one threshold, to determine the random access type and the SSB. This improves a success rate of random access and avoids a waste of system resources.

In the foregoing embodiments, the random access type selection and the SSB selection may be completed when the terminal device performs random access resource selection. In this case, after a random access failure, for example, a random access failure caused when a random access response time window (RAR time window) expires or a contention resolution timer expires, the terminal device re-initiates new random access, and the terminal device may reselect a random access type and an SSB based on the preconfigured threshold.

In the random access procedure, different terminal devices may select different random access types. For example, some terminal devices select the 2-step random access and send a message A, and other terminal devices select the 4-step random access and send a message 1. The network device receives different types of random access messages sent by different terminal devices, detects and/or decodes the random access messages, and sends response messages to the terminal devices based on detection or decoding results of the random access messages. To reduce complexity of detecting random access response messages by the terminal device, the network device side may predefine some identification methods for different types of random access response messages. Possible methods for distinguishing different types of random access response messages are as follows:

1. When the network device sends a random access response message, the network device may distinguish different random access response messages by using different search spaces (search space)/control resource sets (control resource set, CORESET). Correspondingly, on the terminal device side, when the terminal device receives the random access response message, the terminal device may listen to random access response messages for the 2-step random access and the 4-step random access in different search spaces or CORESETs. For example, when the random access response message is a PDCCH, the PDCCH is used to schedule a response message, that is, a message B, for the message A, or the PDCCH is used to schedule a response message, that is, a message 2, for the message 1.
2. Alternatively, when the network device sends a random access response message, the network device may distinguish different random access response messages by using different scrambling sequences, for example, random access radio network identifiers (random access radio network temporary identifier, RA-RNTI). To be specific, different RA-RNTIs are used for a PDCCH used to schedule a response message for the 2-step random access and a PDCCH used to schedule a response message for the 4-step random access. The RA-RNTI may be generated by the network device based on information about a time/frequency resource of a random access transmission occasion.

Resource allocation for the 2-step random access and the 4-step random access includes the following two manners: separate random access transmission occasions (separate RO), and a shared random access transmission occasion (shared RO). In the case of the separate random access transmission occasions, a time/frequency resource of the RO of the 2-step random access is different from a time/frequency resource of the RO of the 4-step random access. In this case, RA-RNTIs corresponding to the two random access types are different. In the case of the shared random access transmission occasion, a time/frequency resource of the RO of the 2-step random access is the same as a time/frequency resource of the RO of the 4-step random access. In this case, RA-RNTIs obtained based on the time/frequency resource of the RO are the same.

To distinguish different random access response messages, in this embodiment of this application, a generation formula of the RA-RNTI may be modified.

In Rel-15 NR, a generation formula of an RA-RNTI of the response message for the 4-step random access is:

$$RA\_\mathrm{RNTI}=1+s\_id+14\times t\_id+14\times 80\times f\_id+14\times 80\times 8\times ul\_\mathrm{carrier}\_id.$$

Based on the generation formula, in this embodiment of this application, a generation formula of an RA-RNTI of the response message for the 2-step random access may be:

$$RA\_\mathrm{RNTI\_2step}=1+1+s\_id+14\times t\_id+14\times 80\times f\_id+14\times 80\times 8\times ul\_\mathrm{carrier}\_id=2+s\_id+14\times t\_id+14\times 80\times f\_id+14\times 80\times 8\times ul\_\mathrm{carrier}\_id.$$

Figure 12:
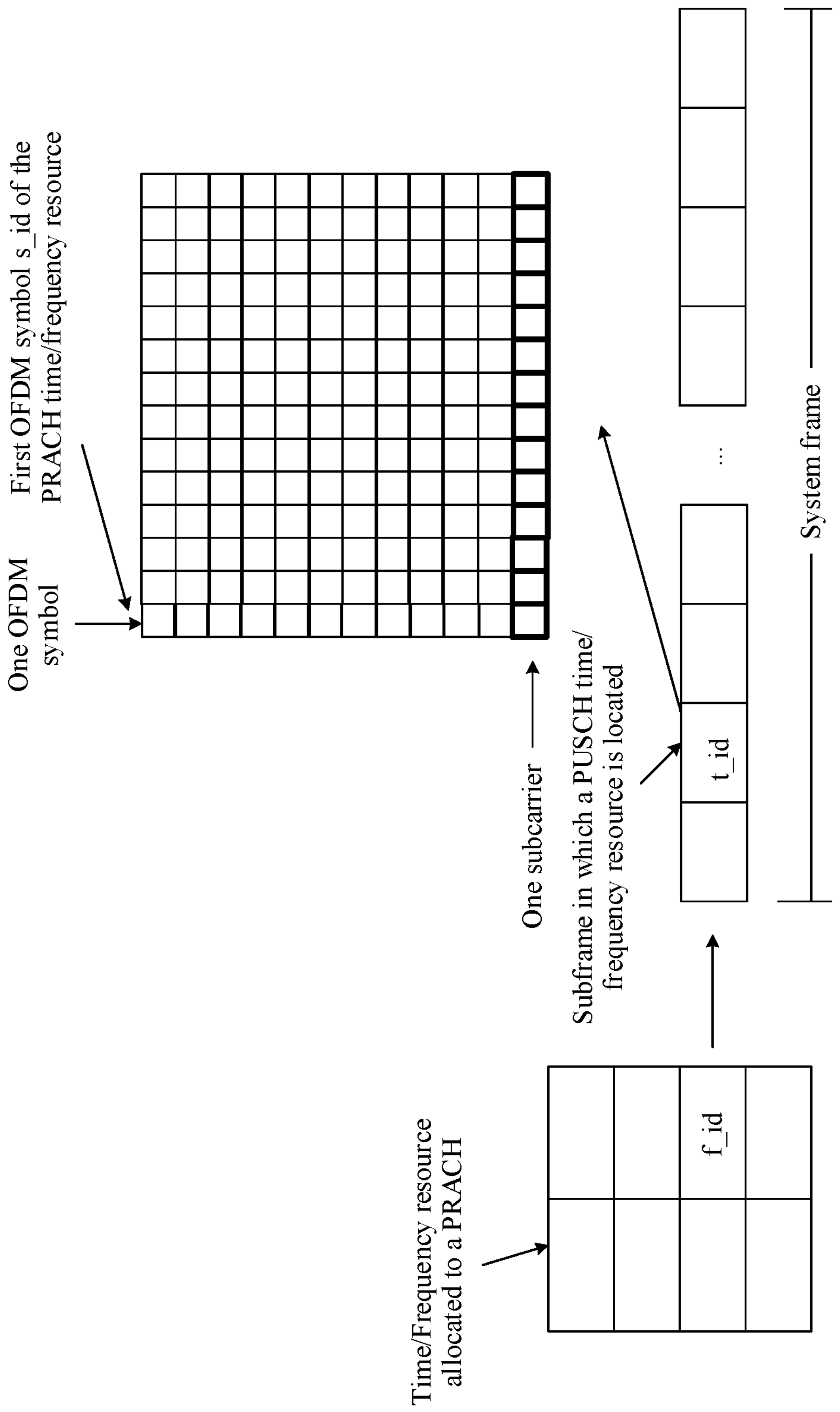
FIG. 12 is a schematic diagram of calculation of an RA_RNTI based on an RO according to an embodiment of this application.

RA_RNTI_2step is a scrambling sequence value that is used for the response message for the 2-step random access and that is obtained through calculation based on a PRACH time/frequency resource that is configured by the network device for the terminal device and that is of a random access transmission occasion, s_id represents the first OFDM symbol of the PRACH time/frequency resource configured by the network device for the terminal device, t_id represents an index number of the first subframe in a system frame of a PUSCH time/frequency resource configured by the network device for the terminal device, f_id represents a frequency-domain index number of the PRACH time/frequency resource configured for the terminal device, ul_carrier_id represents an uplink carrier on which the random access message A is transmitted, 0 represents a normal uplink NUL, and 1 represents a supplementary uplink SUL. As shown in FIG. 12, a quantity of time/frequency resources allocated by the network device to a PRACH is 8 (where a maximum quantity of frequency domain resources allocated to a random access channel in a protocol is 8), a system frame of one time/frequency resource may be 10 ms, and a maximum subcarrier spacing may be 120 KHz. Correspondingly, in time domain, one system frame includes 80 subframes, and a length of each subframe may be 0.125 ms. One subframe may include 14 OFDM symbols in time domain, and may include 12 subcarriers in frequency domain. The first OFDM symbol of the PRACH time/frequency resources is shown in FIG. 12.

A minimum time domain transmission unit currently used for PRACH transmission is two OFDM symbols, so that a generated value of RA_RNTI_2step does not conflict with a generated value of the RA_RNTI.

It can be learned that, in comparison with the generation formula of the RA-RNTI of the response message for the 4-step random access, in the generation formula of the RA-RNTI of the response message for the 2-step random access, 1 is added, so that different random access response messages can be distinguished. In this way, the terminal device can identify different types of random access response messages, and the complexity of detecting the random access response message by the terminal device is reduced.

The foregoing mainly describes the solutions provided in the embodiments of this application from a perspective of interaction between network elements. It can be understood that, to implement the foregoing functions, the network elements, for example, the terminal device and the network device, include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the terminal device, the network device, and the like may be divided into functional modules based on the foregoing method examples. For example, each functional module may be divided corresponding to each function, or two or more functions may be integrated into one processing module. The integrated module may be implemented in a form of hardware, or may be implemented in a form of a software functional module. It should be noted that, in the embodiments of this application, division into the modules is an example, is merely logical function division, and may be other division in actual implementation.

Figure 13:
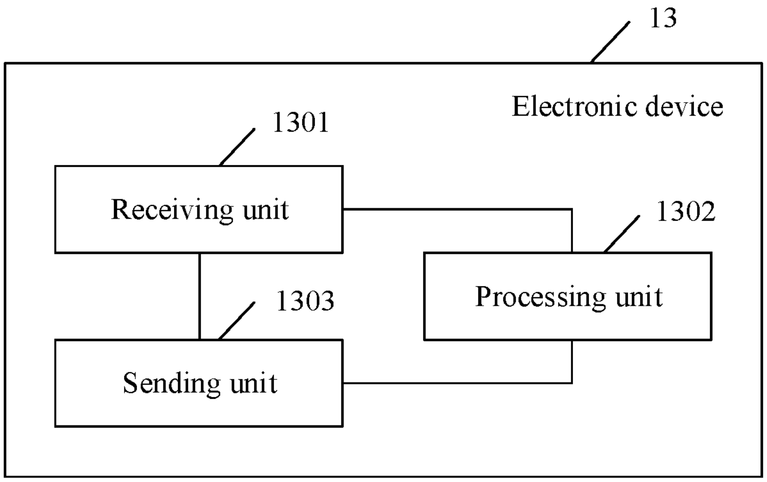
FIG. 13 is a schematic structural diagram of an electronic device according to an embodiment of this application.

When each function module is divided corresponding to each function, FIG. 13 is a schematic structural diagram of an electronic device 13. The electronic device may be the terminal device in the foregoing embodiments, or may be a chip. The electronic device 13 includes a receiving unit 1301, a processing unit 1302, and a sending unit 1303. The receiving unit 1301 is configured to support the electronic device in performing process 702 in FIG. 7, process 802 in FIG. 8A, process 902 in FIG. 9A, process 102 in FIG. 10, and process 112 in FIG. 11. The processing unit 1302 is configured to support the electronic device in performing processes 602 and 603 in FIG. 6, processes 703, 704, and 705 in FIG. 7, processes 803, 804, 805, 806, 807, and 810 in FIG. 8A and FIG. 8B, processes 903, 904, 905, 906, and 907 in FIG. 9A and FIG. 9B, processes 103 and 104 in FIG. 10, and processes 113 and 114 in FIG. 11. The sending unit 1303 is configured to perform process 604 in FIG. 6, processes 706 and 707 in FIG. 7, processes 808, 809, and 811 in FIG. 8A and FIG. 8B, processes 908 and 909 in FIG. 9B, processes 105 and 106 in FIG. 10, and processes 115 and 116 in FIG. 11. All related content of the steps in the foregoing method embodiments may be cited in function descriptions of corresponding functional modules. Details are not described herein again.

Figure 14:
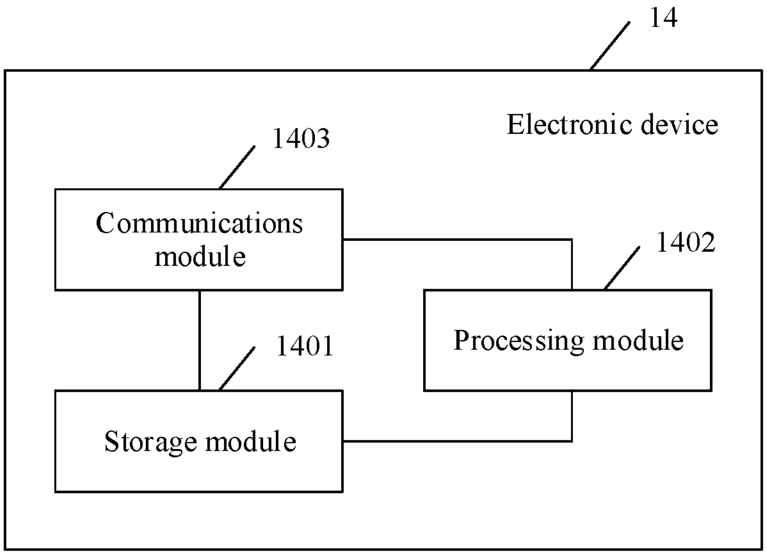
FIG. 14 is a schematic structural diagram of an electronic device according to an embodiment of this application.

When an integrated unit is used, FIG. 14 is a possible schematic structural diagram of an electronic device 14. The electronic device may be the terminal device in the foregoing embodiments, or may be a chip. The electronic device 14 includes a processing module 1402 and a communications module 1403. A function of the processing module 1402 is similar to that of the processing unit 1302. The communications module 1403 includes functions of the receiving unit 1301 and the sending unit 1303. The processing module 1402 is configured to control and manage an action of the electronic device 14. For example, the processing module 1402 is configured to support the electronic device 14 in performing processes 602 and 603 in FIG. 6, processes 703, 704, and 705 in FIG. 7, processes 803, 804, 805, 806, 807, 808, and 809 in FIG. 8A and FIG. 8B, processes 903, 904, 905, 906, and 907 in FIG. 9A and FIG. 9B, processes 103 and 104 in FIG. 10, processes 113 and 114 in FIG. 11, and/or other processes of the technology described in this specification. The communications module 1403 is configured to support the electronic device in communicating with another network entity, for example, communicating with a network device. The electronic device 14 may further include a storage module 1401, configured to store program code and data of the electronic device 14.

The processing module 1402 may be a processor or a controller, for example, a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processing module 1402 may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor. The communications module 1403 may be a transceiver, a transceiver circuit, a communications interface, or the like. The storage module 1401 may be a memory.

Figure 15:
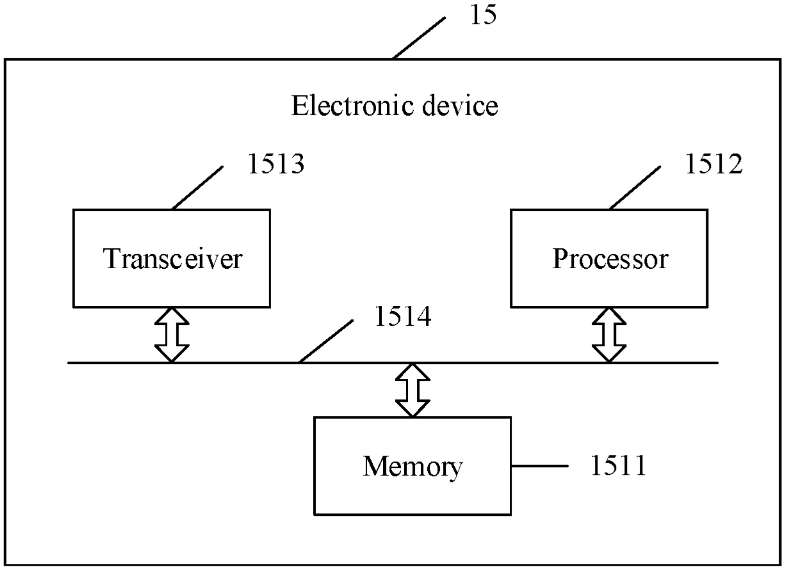
FIG. 15 is a schematic structural diagram of an electronic device according to an embodiment of this application.

When the processing module 1402 is a processor, the communications module 1403 is a transceiver, and the storage module 1401 is a memory, the electronic device 14 in this embodiment of this application may be an electronic device shown in FIG. 15.

As shown in FIG. 15, the electronic device 15 includes a processor 1512, a transceiver 1513, a memory 1511, and a bus 1514. The transceiver 1513, the processor 1512, and the memory 1511 are connected to each other through the bus 1514. The bus 1514 may be a peripheral component interconnect (PCI) standard bus, an extended industry standard architecture (EISA) bus, or the like. The bus may be classified into an address bus, a data bus, a control bus, or the like. For ease of representation, only one thick line is used to represent the bus in FIG. 15, but this does not mean that there is only one bus or only one type of bus.

Figure 16:
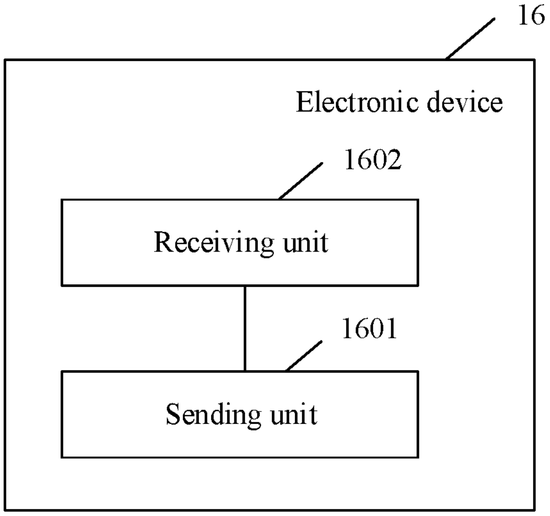
FIG. 16 is a schematic structural diagram of an electronic device according to an embodiment of this application.

When each function module is divided corresponding to each function, FIG. 16 is a possible schematic structural diagram of an electronic device 16. The electronic device may be the network device in the foregoing embodiments, or may be a chip. The electronic device 16 includes a sending unit 1601 and a receiving unit 1602. The sending unit 1601 is configured to support the electronic device 16 in performing process 601 in FIG. 6, process 701 in FIG. 7, process 801 in FIG. 8A, process 901 in FIG. 9A, process 101 in FIG. 10, and process 111 in FIG. 11. The receiving unit 1602 is configured to perform processes corresponding to process 604 in FIG. 6, processes 706 and 707 in FIG. 7, processes 808, 809, and 811 in FIG. 8A and FIG. 8B, processes 908 and 909 in FIG. 9B, processes 105 and 106 in FIG. 10, and processes 115 and 116 in FIG. 11. All related content of the steps in the foregoing method embodiments may be cited in function descriptions of corresponding functional modules. Details are not described herein again.

Figure 17:
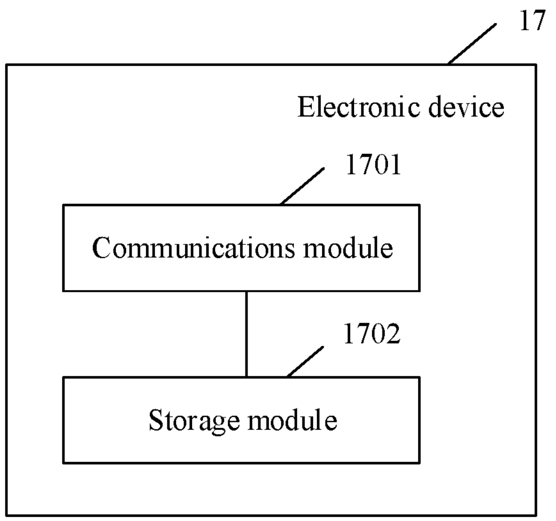
FIG. 17 is a schematic structural diagram of an electronic device according to an embodiment of this application.

When an integrated unit is used, FIG. 17 is a possible schematic structural diagram of an electronic device 17. The electronic device may be the network device in the foregoing embodiments, or may be a chip. The electronic device 17 includes a communications module 1701 and a storage module 1702. A function of the communications module 1701 includes functions of the sending unit 1601 and the receiving unit 1602. The communications module 1701 is configured to support the electronic device in communicating with another network entity, for example, communicating with a terminal device. The storage module 1702 is configured to store program code and data of the electronic device.

The communications module 1701 may be a transceiver, a transceiver circuit, a communications interface, or the like. The storage module 1702 may be a memory.

Figure 18:
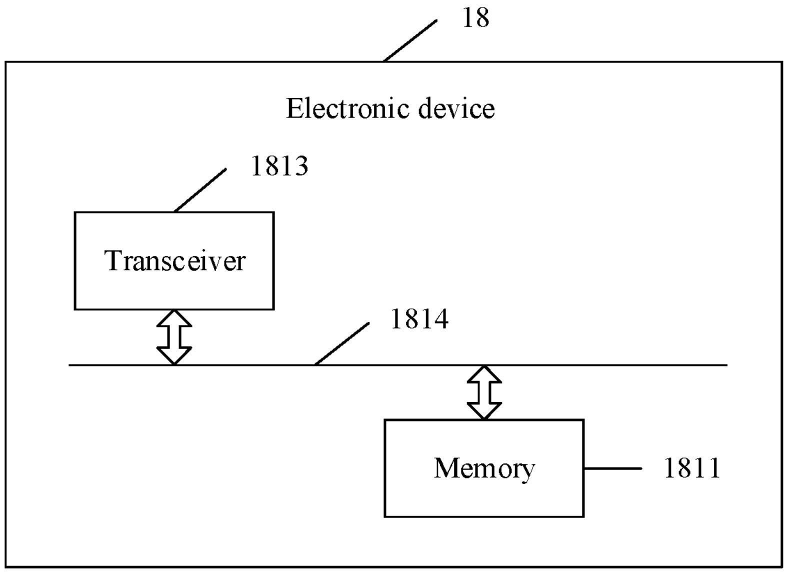
FIG. 18 is a schematic structural diagram of an electronic device according to an embodiment of this application.

When the communications module 1701 is a transceiver, and the storage module 1702 is a memory, the electronic device 17 in this embodiment of this application may be an electronic device shown in FIG. 18.

As shown in FIG. 18, the electronic device 18 includes a transceiver 1813, a memory 1811, and a bus 1814. The transceiver 1813 and the memory 1811 are connected to each other through the bus 1814. The bus 1814 may be a PCI bus, an EISA bus, or the like. The bus may be classified into an address bus, a data bus, a control bus, or the like. For ease of representation, only one thick line is used to represent the bus in FIG. 18, but this does not mean that there is only one bus or only one type of bus.

An embodiment of this application further provides a computer-readable storage medium, configured to store a computer software instruction used by the Internet of Things server, and the computer software instruction includes a program designed to perform the foregoing method embodiments.

An embodiment of this application further provides a computer program product including an instruction. When the computer program product runs on an electronic device, the electronic device is enabled to perform the methods in the foregoing method embodiments.

Method or algorithm steps described in combination with the content disclosed in this application may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (electrically ePROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a core network interface device. Certainly, the processor and the storage medium may exist in the core network interface device as discrete components.

A person skilled in the art should be aware that, in the foregoing one or more examples, functions described in this application may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A random access method, comprising:

receiving, by a terminal device, configuration information sent by a network device, wherein the configuration information comprises a first threshold and a second threshold, the first threshold is used by the terminal device to select a random access type, the random access type is 2-step random access or 4-step random access, the second threshold is used by the terminal device for 2-step random access and 4-step random access and to select a downlink reference signal from a plurality of downlink reference signals, each of the plurality of downlink reference signals is associated with one or more random access transmission occasions and is a synchronization signal block (SSB), the second threshold for 2-step random access is different from the second threshold for 4-step random access, the second threshold is a reference signal received power (RSRP) threshold, and the first threshold is a RSRP threshold;

determining, by the terminal device, the random access type based on the first threshold and the downlink reference signal based on the second threshold;

determining, by the terminal device, a random access transmission occasion based on the determined downlink reference signal; and sending, by the terminal device, a message of the random access type on the random access transmission occasion, wherein the first threshold is greater than or equal to the second threshold; and the determining, by the terminal device, the random access type based on the first threshold and the downlink reference signal based on the second threshold comprises:

based on a channel measurement value of the terminal device being greater than or equal to the first threshold and an RSRP of at least one downlink reference signal being greater than or equal to the first threshold, determining the downlink reference signal from the at least one downlink reference signal; and based on a measurement value of the determined downlink reference signal being greater than or equal to a third threshold, determining that the random access type is 2-step random access; or based on the measurement value of the determined downlink reference signal being less than the third threshold, determining that the random access type is 4-step random access, wherein a type of the measurement value of the determined downlink reference signal is the same as a type of the first threshold.

2. The method according to claim 1, wherein the determining, by the terminal device, the random access type based on the first threshold comprises:

determining, by the terminal device, the random access type based on a channel measurement value and the first threshold, wherein the channel measurement value is a measurement value obtained based on RSRPs of the plurality of downlink reference signals.

3. The method according to claim 2, wherein the determining, by the terminal device, the random access type based on the first threshold and the downlink reference signal based on the second threshold comprises:

based on determining that the channel measurement value is greater than or equal to the first threshold, determining, by the terminal device, that the random access manner is 2-step random access; and based on determining that a measurement value of at least one received downlink reference signal is greater than or equal to the second threshold, determining, by the terminal device, one downlink reference signal from the at least one downlink reference signal.

4. The method according to claim 2, wherein the determining, by the terminal device, the random access type based on the first threshold and the downlink reference signal based on the second threshold comprises:

based on determining that the channel measurement value is less than the first threshold, determining, by the terminal device, that the random access manner is 4-step random access.

5. The method according to claim 1, wherein the determining, by the terminal device, the random access type based on the first threshold and the downlink reference signal based on the second threshold comprises:

based on determining that an RSRP of at least one downlink reference signal in the plurality of received downlink reference signals is greater than or equal to the second threshold, determining, by the terminal device, the downlink reference signal from the at least one downlink reference signal; and based on a measurement value of the determined downlink reference signal is greater than or equal to the first threshold, determining that the random access type is 2-step random access; or based on a measurement value of the determined downlink reference signal is less than the first threshold, determining that the random access type is 4-step random access, wherein a type of the measurement value of the determined downlink reference signal is the same as a type of the first threshold.

6. The method according to claim 1, wherein the determining, by the terminal device, the random access type based on the first threshold and the downlink reference signal based on the second threshold comprises:

based on determining that RSRPs of the plurality of received downlink reference signals are less than the second threshold, determining, by the terminal device, the downlink reference signal from the plurality of received downlink reference signals, and determining that the random access type is the 4-step random access.

7. The method according to claim 1, wherein the first threshold is less than the second threshold; and the determining, by the terminal device, the random access type based on the first threshold and the downlink reference signal based on the second threshold comprises: based on determining that a channel measurement value is greater than or equal to the first threshold and an RSRP of at least one downlink reference signal is greater than or equal to the second threshold, selecting, by the terminal device, the downlink reference signal from the at least one downlink reference signal, and determining that the random access manner is 2-step random access; or based on determining that a channel quality measurement value is greater than or equal to the first threshold and RSRPs of the plurality of received downlink reference signals are less than the second threshold, selecting, by the terminal device, the downlink reference signal from all downlink reference signals whose RSRPs are greater than or equal to the first threshold; and based on a measurement value of the selected downlink reference signal is greater than or equal to a third threshold, determining that the random access type is 2-step random access, wherein a type of the measurement value of the selected downlink reference signal is the same as a type of the first threshold.

8. The method according to claim 1, wherein the first threshold is an RSRP threshold include: the first threshold is an RSRP threshold and at least one of the following:

a threshold of a size of to-be-transmitted uplink data, and a threshold of a time difference between a first random access transmission occasion and a second random access transmission occasion associated with a same downlink reference signal, wherein the first random access transmission occasion and the second random access transmission occasion correspond to different random access types.

9. A random access method, comprising:

sending, by a network device, configuration information to a terminal device, wherein the configuration information comprises a first threshold and a second threshold, the first threshold is used by the terminal device to select a random access type, the random access type is 2-step random access or 4-step random access, the second threshold is used by the terminal device for 2-step random access and 4-step random access and to select a downlink reference signal from a plurality of downlink reference signals, each of the plurality of downlink reference signals is associated with one or more random access transmission occasions and is a synchronization signal block (SSB), the second threshold for 2-step random access is different from the second threshold for 4-step random access, the second threshold is a reference signal received power (RSRP) threshold, and the first threshold is a RSRP threshold; and receiving, by the network device, a message of the random access type that is sent by the terminal device on a random access transmission occasion, the random access type and the random access transmission occasion having been determined by the terminal device based on the configuration information, the random access type having been determined based on the first threshold and the random access transmission occasion having been determined based on a downlink reference signal determined based on the second threshold;

wherein the first threshold is greater than or equal to the second threshold, the random access type having been determined by the terminal device based on the first threshold by:

based on a channel measurement value of the terminal device being greater than or equal to the first threshold and an RSRP of at least one downlink reference signal being greater than or equal to the first threshold, determining the downlink reference signal from the at least one downlink reference signal; and the downlink reference signal having been determined by the terminal device based on the second threshold by:

based on a measurement value of the determined downlink reference signal being greater than or equal to a third threshold, determining that the random access type is 2-step random access; or based on the measurement value of the determined downlink reference signal being less than the third threshold, determining that the random access type is 4-step random access, wherein a type of the measurement value of the determined downlink reference signal is the same as a type of the first threshold.

10. The method according to claim 9, wherein the first threshold is an RSRP threshold include: the first threshold is an RSRP threshold and at least one of the following:

a threshold of a size of to-be-transmitted uplink data, and a threshold of a time difference between a first random access transmission occasion and a second random access transmission occasion associated with a same downlink reference signal, wherein the first random access transmission occasion and the second random access transmission occasion correspond to different random access types.

11. A terminal device, wherein the terminal device comprises:

a transceiver, configured to receive configuration information sent by a network device, wherein the configuration information comprises a first threshold and a second threshold, the first threshold is used by the terminal device to select a random access type, the random access type is 2-step random access or 4-step random access, the second threshold is used by the terminal device for 2-step random access and 4-step random access and to select a downlink reference signal from a plurality of downlink reference signals, each of the plurality of downlink reference signals is associated with one or more random access transmission occasions and is a synchronization signal block (SSB), the second threshold for 2-step random access is different from the second threshold for 4-step random access, the second threshold is a reference signal received power (RSRP) threshold, and the first threshold is a RSRP threshold; and a processor, configured to determine the random access type based on the first threshold and the downlink reference signal based on the second threshold, wherein the processor is further configured to determine a random access transmission occasion based on the determined downlink reference signal, and the transceiver is further configured to send a message of the random access type on the random access transmission occasion, wherein the first threshold is greater than or equal to the second threshold; and the processor is configured to:

based on a channel measurement value of the terminal device being greater than or equal to the first threshold and an RSRP of at least one downlink reference signal being greater than or equal to the first threshold, determine the downlink reference signal from the at least one downlink reference signal; and based on a measurement value of the determined downlink reference signal being greater than or equal to a third threshold, determine that the random access type is 2-step random access; or based on the measurement value of the determined downlink reference signal being less than the third threshold, determine that the random access type is 4-step random access, wherein a type of the measurement value of the determined downlink reference signal is the same as a type of the first threshold.

12. The terminal device according to claim 11, wherein the processor is configured to:

determine the random access type based on a channel measurement value and the first threshold, wherein the channel measurement value is a measurement value obtained based on RSRPs of the plurality of reference signals.

13. The terminal device according to claim 12, wherein the processor is configured to:

based on determining that the channel measurement value is greater than or equal to the first threshold, determine that the random access manner is 2-step random access; and based on determining that a measurement value of at least one received downlink reference signal is greater than or equal to the second threshold, determine the downlink reference signal from the at least one downlink reference signal.

14. The terminal device according to claim 12, wherein the processor is configured to: based on determining that the channel measurement value is less than the first threshold, determine that the random access manner is 4-step random access.

15. The terminal device according to claim 11, wherein the processor is configured to:

based on determining that an RSRP of at least one downlink reference signal in the plurality of received downlink reference signals is greater than or equal to the second threshold, determine the downlink reference signal from the at least one downlink reference signal; and based on a measurement value of the determined downlink reference signal is greater than or equal to the first threshold, determine that the random access type is 2-step random access; or based on a measurement value of the determined downlink reference signal is less than the first threshold, determine that the random access type is 4-step random access, wherein a type of the measurement value of the determined downlink reference signal is the same as a type of the first threshold.

16. The terminal device according to claim 12, wherein the processor is configured to:

based on determining that RSRPs of the plurality of received downlink reference signals are less than the second threshold, determine the downlink reference signal from the plurality of received downlink reference signals, and determine that the random access type is the 4-step random access.

17. The terminal device according to claim 11, wherein the first threshold is less than the second threshold; and the processor is configured to:

based on determining that a channel measurement value is greater than or equal to the first threshold and an RSRP of at least one downlink reference signal is greater than or equal to the second threshold, select the downlink reference signal from the at least one downlink reference signal, and determine that the random access manner is 2-step random access; or based on determining that a channel quality measurement value is greater than or equal to the first threshold and RSRPs of the plurality of received downlink reference signals are less than the second threshold, select the downlink reference signal from all downlink reference signals whose RSRPs are greater than or equal to the first threshold; and based on a measurement value of the selected downlink reference signal being greater than or equal to a third threshold, determine that the random access type is 2-step random access, wherein a type of the measurement value of the selected downlink reference signal is the same as a type of the first threshold.

18. The terminal device according to claim 11, wherein the first threshold is an RSRP threshold include: the first threshold is an RSRP threshold and at least one of the following:

a threshold of a size of to-be-transmitted uplink data, and a threshold of a time difference between a first random access transmission occasion and a second random access transmission occasion associated with a same downlink reference signal, wherein the first random access transmission occasion and the second random access transmission occasion correspond to different random access types.

* * * * *